(12) United States Patent
Fujitake

(10) Patent No.: US 11,732,662 B2
(45) Date of Patent: Aug. 22, 2023

(54) CONTROL APPARATUS FOR HYBRID ELECTRIC VEHICLE

(71) Applicant: TOYOTA JIDOSHA KABUSHIKI KAISHA, Aichi-ken (JP)

(72) Inventor: Yoshinori Fujitake, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 17/931,549

(22) Filed: Sep. 13, 2022

(65) Prior Publication Data
US 2023/0120778 A1    Apr. 20, 2023

(30) Foreign Application Priority Data
Oct. 14, 2021    (JP) .................. 2021-168797

(51) Int. Cl.
*F02D 13/06*    (2006.01)
*F02D 17/02*    (2006.01)
*F02D 29/06*    (2006.01)
*F02D 41/04*    (2006.01)
*F02D 41/00*    (2006.01)

(52) U.S. Cl.
CPC .......... *F02D 41/042* (2013.01); *F02D 13/06* (2013.01); *F02D 17/02* (2013.01); *F02D 29/06* (2013.01); *F02D 41/0087* (2013.01); *F02D 2200/50* (2013.01); *F02D 2200/503* (2013.01)

(58) Field of Classification Search
CPC .......... F02D 13/06; F02D 17/00; F02D 17/02; F02D 29/06; F02D 41/0087; F02D 2200/503; F02D 2250/24
USPC ............................................. 123/198 F, 481
See application file for complete search history.

(56) References Cited

U.S. PATENT DOCUMENTS

| 6,953,021 B2* | 10/2005 | Wakashiro | B60W 30/18127 123/481 |
| 7,163,487 B2* | 1/2007 | Tao | B60W 20/13 477/3 |
| 2003/0102175 A1* | 6/2003 | Wakashiro | F02D 41/123 903/918 |
| 2013/0079960 A1* | 3/2013 | Brennan | F02D 41/0087 180/65.21 |

(Continued)

FOREIGN PATENT DOCUMENTS

JP    2004324574 A    11/2004

*Primary Examiner* — Erick R Solis
(74) *Attorney, Agent, or Firm* — Hauptman Ham, LLP

(57) ABSTRACT

A CPU performs a regeneration process of stopping combustion control in one or some of cylinders and making the air-fuel ratio of an air-fuel mixture in the other cylinders or cylinder richer than a theoretical air-fuel ratio, when the amount of PM collected by a GPF increases. In performing the regeneration process, the CPU itself compensates for a fall in the output of an internal combustion engine by gradually increasing the filling efficiency of the other cylinders or cylinder. It should be noted, however, that since the output of the internal combustion engine temporarily fluctuates, the CPU compensates for the fluctuations through the use of a second motor-generator. The CPU varies the retardation amount of a timing of starting the regeneration process with respect to a timing of gradually increasing the filling efficiency, in accordance with the state of a battery.

8 Claims, 14 Drawing Sheets

(56) References Cited

U.S. PATENT DOCUMENTS

2020/0223425 A1* 7/2020 Ford .................... B60W 20/15
2021/0381446 A1* 12/2021 Etzel .................. F16H 57/0006

* cited by examiner

CONTROL APPARATUS FOR HYBRID ELECTRIC VEHICLE

CROSS-REFERENCE TO RELATED APPLICATION

This application claims priority to Japanese Patent Application No. 2021-168797 filed on Oct. 14, 2021, incorporated herein by reference in its entirety.

BACKGROUND

1. Technical Field

The disclosure relates to a control apparatus for a hybrid electric vehicle.

2. Description of Related Art

For example, a control apparatus that compensates for a decrease in torque caused by stopping the supply of fuel to an internal combustion engine with a torque of a motor is described in Japanese Unexamined Patent Application Publication No. 2004-324574 (JP 2004-324574 A) ([0043]).

SUMMARY

In the aforementioned case, the decrease in torque cannot be compensated for when the electric power that can be output by an electrical storage device that supplies electric power to the motor is small. Besides, for example, the torque of the internal combustion engine rises stepwise as the supply of fuel to the internal combustion engine is started. Therefore, the inventor studied the idea of absorbing part of the torque through the use of a motor-generator. In this case, however, the motor-generator cannot absorb the torque when the electric power with which the electrical storage device can be charged is small. In thus making an attempt to compensate for discontinuous changes in the output of the internal combustion engine by the motor-generator, it may be impossible to carry out the compensation sufficiently when the electrical storage device is in a certain state.

Means for solving the aforementioned problem and operations and effects thereof will be described hereinafter.

1. A control apparatus is applied to a hybrid electric vehicle equipped with a rotating electrical machine that applies motive power to a driving wheel, an electrical storage device that is charged and discharged by the rotating electrical machine, and an internal combustion engine that applies motive power to the driving wheel. The internal combustion engine is equipped with a plurality of cylinders. The control apparatus performs a stop process, a combustion energy amount increase process, and a timing variability process. The stop process is a process of stopping combustion control in one or some of the cylinders of the internal combustion engine. The combustion energy amount increase process is a process of increasing an amount of combustion energy in the cylinders or cylinder where the stop process is not performed. The timing variability process is a process of varying a retardation amount of a timing of starting the stop process with respect to a timing of starting the combustion energy amount increase process in accordance with a state of the electrical storage device.

The output of the internal combustion engine discontinuously decreases through the stop process. In contrast, when the amount of combustion energy in the cylinders or cylinder where combustion control of the internal combustion engine is continued is raised, the rise in the output of the internal combustion engine may have a response delay resulting from a response delay in increasing the amount of air. Therefore, even in the case where a fall in output through the stop process is compensated for by the combustion energy amount increase process, it is difficult to avoid a rapid change in the output of the internal combustion engine. In contrast, the output of rotating electrical machine has higher responsiveness than the output of the internal combustion engine. Therefore, the output of the internal combustion engine can be restrained from changing rapidly, by using the output of the rotating electrical machine. It should be noted, however, that the compensation by the output of the rotating electrical machine is subject to restrictions, depending on the state of the electrical storage device.

By the way, the sign and magnitude of the output to be compensated for differ depending on the retardation amount of the timing of starting the stop process with respect to the timing of starting the combustion energy amount increase process. That is, the output of the internal combustion engine temporarily falls greatly, for example, when the retardation amount is zero. Therefore, the output required of the rotating electrical machine for compensation is desired to be positive. Besides, the output of the internal combustion engine rapidly falls from an output larger than a target value thereof, for example, when the retardation amount is sufficiently large. Therefore, the output required of the rotating electrical machine for compensation is desired to be made negative before the start of the stop process.

In view of the foregoing, it is understood that the output required of the rotating electrical machine can be varied by adjusting the retardation amount. Accordingly, in the foregoing configuration, the compensation for the output by the rotating electrical machine can be sufficiently carried out by varying the retardation amount in accordance with the state of the electrical storage device.

2. In the control apparatus for the hybrid electric vehicle described above in 1, the timing variability process includes a process of variably setting the retardation amount of the timing of starting the stop process with respect to the timing of starting the combustion energy amount increase process in accordance with a charge-discharge electric power of the electrical storage device, and making the retardation amount in a case where the charge-discharge electric power is large equal to or larger than the retardation amount in a case where the charge-discharge electric power is small, and the charge-discharge electric power is positive when the electrical storage device is discharged.

It is more difficult to increase the output of the rotating electrical machine when the charge-discharge electric power is large than when the charge-discharge electric power is small On the other hand, the output compensated for by the rotating electrical machine assumes a value that is smaller, namely, closer to regeneration when the retardation amount is large than when the retardation amount is small. Therefore, in the foregoing configuration, the retardation amount is decided in accordance with the charge-discharge electric power while making the retardation amount in the case where the charge-discharge electric power is large equal to or larger than the retardation amount in the case where the charge-discharge electric power is small. This process includes a process of making the retardation amount larger when the charge-discharge electric power is large than when the charge-discharge electric power is small. Thus, the amount of increase in the output required for compensation can be made small when it is difficult to increase the output of the rotating electrical machine.

3. In the control apparatus for the hybrid electric vehicle described above in 1, the timing variability process includes a process of variably setting the retardation amount of the timing of starting the stop process with respect to the timing of starting the combustion energy amount increase process in accordance with a charging rate of the electrical storage device, and making the retardation amount in a case where the charging rate is high equal to or smaller than the retardation amount in a case where the charging rate is low.

The electric power that can be regenerated by the rotating electrical machine is smaller when the charging rate is high than when the charging rate is low. On the other hand, the output compensated for by the rotating electrical machine is larger when the retardation amount is small than when the retardation amount is large. Thus, in the foregoing configuration, the retardation amount is variably set in accordance with the charging rate such that the retardation amount in the case where the charging rate is high becomes equal to or smaller than the retardation amount in the case where the charging rate is low. This process includes a process of making the retardation amount smaller when the charging rate is high than when the charging rate is low. Thus, the amount of increase in the output required for compensation can be made large when the electric power that can be regenerated by the rotating electrical machine is small.

4. In the control apparatus for the hybrid electric vehicle described above in 1, the combustion energy amount increase process is a process of gradually increasing an amount of combustion energy in the cylinders or cylinder where the stop process is not performed, and the timing variability process includes a process of starting the stop process while the amount of combustion energy increases gradually, when a temperature of the electrical storage device is equal to or lower than a first temperature or equal to or higher than a second temperature that is higher than the first temperature.

The upper limit of the absolute value of the charge-discharge electric power of the electrical storage device tends to be small when the temperature of the electrical storage device is excessively low or excessively high. It is therefore difficult to increase the absolute value of the amount of change in the output of the rotating electrical machine for compensation when the temperature of the electrical storage device is excessively low or excessively high. On the other hand, in the case where the timing of starting the stop process is a timing during a period in which the amount of energy is gradually increased through the combustion energy amount increase process, the amount of compensation for the output required of the rotating electrical machine decreases and then increases. Accordingly, in the foregoing configuration, the absolute value of the amount of change in output resulting from the compensation by the rotating electrical machine can be made as small as possible, by setting the timing of starting the stop process as the timing during the period.

5. A control apparatus is applied to a hybrid electric vehicle equipped with a rotating electrical machine that applies motive power to a driving wheel, an electrical storage device that is charged and discharged by the rotating electrical machine, and an internal combustion engine that applies motive power to the driving wheel. The internal combustion engine is equipped with a plurality of cylinders. The control apparatus performs a stop process, a combustion energy amount decrease process, and a timing variability process. The stop process is a process of stopping combustion control in one or some of the cylinders of the internal combustion engine. The combustion energy amount decrease process is a process of decreasing an amount of combustion energy in the cylinders or cylinder where the stop process is not performed. The timing variability process includes a process of varying a timing of ending the stop process with respect to a timing of starting the combustion energy amount decrease process in accordance with a state of the electrical storage device.

The sign and magnitude of the output to be compensated for differ depending on the retardation amount of the timing of ending the stop process with respect to the timing of starting the combustion energy amount decrease process. That is, the output of the internal combustion engine temporarily increases greatly, for example, when the retardation amount is zero. Therefore, the output required of the rotating electrical machine for compensation is desired to be made negative. Besides, the output of the internal combustion engine rapidly rises from an output smaller than a target value thereof, for example, when the retardation amount is sufficiently large. Therefore, the output required of the rotating electrical machine for compensation is desired to be made positive in ending the stop process.

In view of the foregoing, it is understood that the output required of the rotating electrical machine can be varied by adjusting the retardation amount. Accordingly, in the foregoing configuration, the compensation for the output by the rotating electrical machine can be sufficiently carried out by varying the retardation amount in accordance with the state of the electrical storage device.

6. In the control apparatus for the hybrid electric vehicle described above in 5, the timing variability process includes a process of variably setting a retardation amount of the timing of ending the stop process with respect to the timing of starting the combustion energy amount decrease process in accordance with a charge-discharge electric power of the electrical storage device, and making the retardation amount in a case where the charge-discharge electric power is small equal to or larger than the retardation amount in a case where the charge-discharge electric power is large, and the charge-discharge electric power is positive when the electrical storage device is discharged.

It is more difficult to increase the regenerative electric power of the rotating electrical machine when the charge-discharge electric power is small than when the charge-discharge electric power is large. On the other hand, the output compensated for by the rotating electrical machine is larger when the retardation amount is large than when the retardation amount is small. Therefore, in the foregoing configuration, the retardation amount is variably set in accordance with the charge-discharge electric power such that the retardation amount in the case where the charge-discharge electric power is small becomes equal to or larger than the retardation amount in the case where the charge-discharge electric power is large. This process includes a process of making the retardation amount larger when the charge-discharge electric power is small than when the charge-discharge electric power is large. Thus, the amount of increase in the output required for compensation can be made large when it is difficult to increase the regenerative electric power of the rotating electrical machine.

7. In the control apparatus for the hybrid electric vehicle described above in 5, the timing variability process includes a process of variably setting a retardation amount of the timing of ending the stop process with respect to the timing of starting the combustion energy amount decrease process in accordance with a charging rate of the electrical storage device, and making the retardation amount in a case where the charging rate is high equal to or larger than the retardation amount in a case where the charging rate is low.

The electric power that can be regenerated by the rotating electrical machine is smaller when the charging rate is high than when the charging rate is low. On the other hand, the output compensated for by the rotating electrical machine is larger when the retardation amount is large than when the retardation amount is small. Thus, in the foregoing configuration, the retardation amount is variably set in accordance with the charging rate such that the retardation amount in the case where the charging rate is high becomes equal to or larger than the retardation amount in the case where the charging rate is low. This process includes a process of making the retardation amount larger when the charging rate is high than when the charging rate is low. Thus, the amount of increase in the output required for compensation can be made large when the electric power that can be regenerated by the rotating electrical machine is small.

8. In the control apparatus for the hybrid electric vehicle described above in 5, the combustion energy amount decrease process is a process of gradually decreasing an amount of combustion energy in the cylinders or cylinder where the stop process is not performed, and the timing variability process includes a process of ending the stop process while the amount of combustion energy decreases gradually, when a temperature of the electrical storage device is equal to or lower than a first temperature or equal to or higher than a second temperature that is higher than the first temperature.

The upper limit of the absolute value of the charge-discharge electric power of the electrical storage device tends to be small when the temperature of the electrical storage device is extremely low or extremely high. It is therefore difficult to increase the absolute value of the amount of change in the output of the rotating electrical machine for compensation when the temperature of the electrical storage device is extremely low or extremely high. On the other hand, in the case where the timing of ending the stop process is a timing during a period in which the amount of energy is gradually decreased through the combustion energy amount decrease process, the amount of compensation for the output required of the rotating electrical machine increases and then decreases. Accordingly, in the foregoing configuration, the absolute value of the amount of change in the output of the rotating electrical machine resulting from compensation can be made as small as possible, by setting the timing of ending the stop process as the timing during the period.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

One of the embodiments will be described hereinafter with reference to the drawings.

Figure 1:
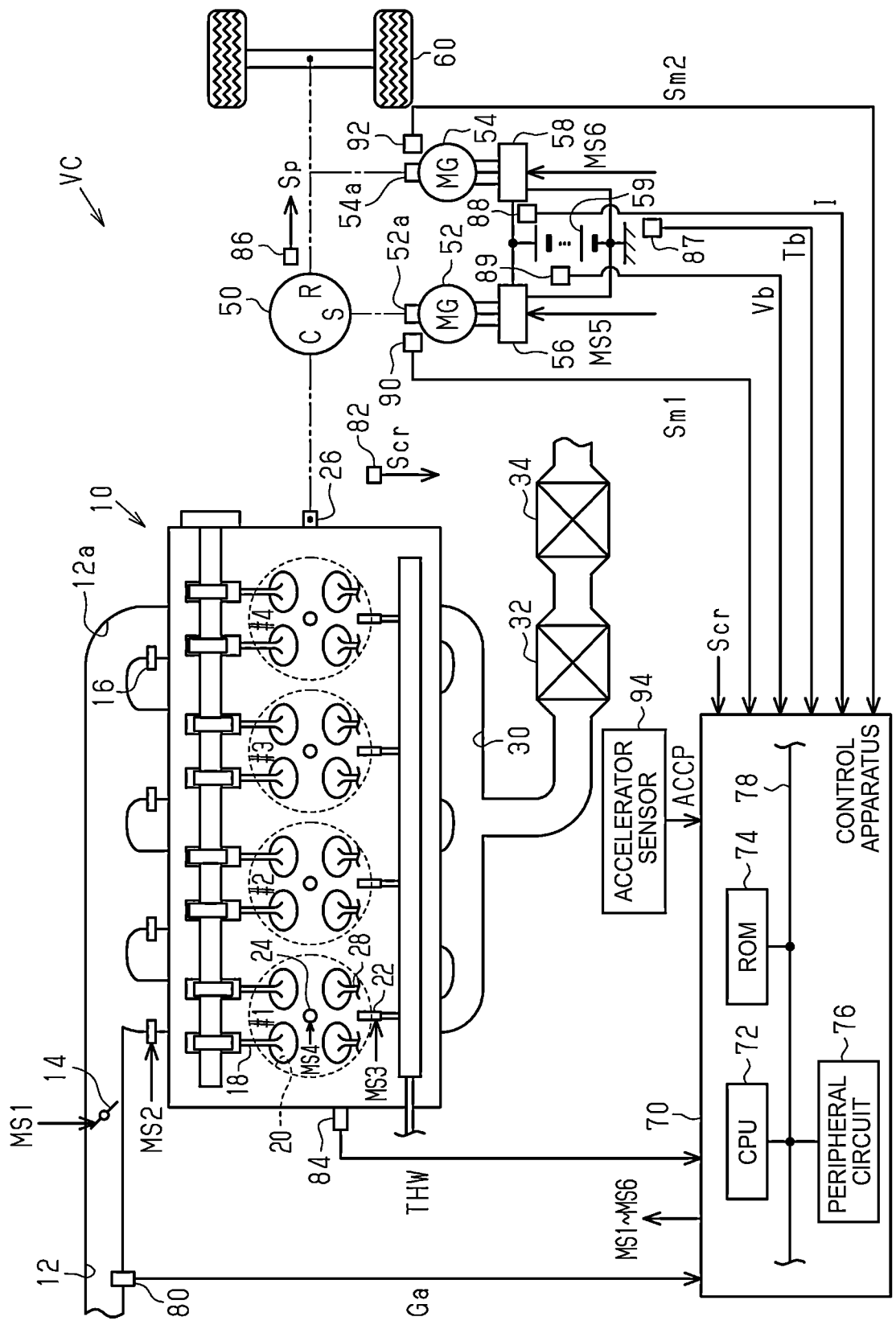
FIG. 1 is a view showing the configuration of a drive train of a vehicle and a control apparatus according to one of the embodiments.

As shown in FIG. 1, an internal combustion engine 10 is equipped with four cylinders #1 to #4. A throttle valve 14 is provided in an intake passage 12 of the internal combustion engine 10. An intake port 12a that is a downstream region of the intake passage 12 is provided with port injection valves 16 that inject fuel into the intake port 12a. The air sucked into the intake passage 12 and the fuel injected from the port injection valves 16 flow into combustion chambers 20 as intake valves 18 are opened, respectively. Fuel is injected into the combustion chambers 20 from in-cylinder injection valves 22 respectively. Besides, a mixture of air and fuel in the combustion chambers 20 is used for combustion in response to spark discharge from ignition devices 24. The combustion energy produced at this time is converted into rotational energy of a crankshaft 26.

The air-fuel mixture used for combustion in the combustion chambers 20 is discharged to an exhaust passage 30 as exhaust gas, as exhaust valves 28 are opened. A three-way catalyst 32 capable of occluding oxygen and a gasoline particulate filter (GPF) 34 are provided in the exhaust passage 30. Incidentally, the GPF 34 is obtained by having the three-way catalyst carried on a filter for collecting PM.

The crankshaft 26 is mechanically coupled to a carrier C of a planetary gear mechanism 50 that constitutes a motive power division device. A rotary shaft 52a of a first motor-generator 52 is mechanically coupled to a sun gear S of the planetary gear mechanism 50. Besides, a rotary shaft 54a of a second motor-generator 54 and driving wheels 60 are mechanically coupled to a ring gear R of the planetary gear mechanism 50. An alternating-current voltage is applied to a terminal of the first motor-generator 52 by a first inverter 56. Besides, an alternating-current voltage is applied to a terminal of the second motor-generator 54 by a second inverter 58. Both the first inverter 56 and the second inverter 58 are electric power conversion circuits that convert a terminal voltage of a battery 59 as a direct-current voltage source into an alternating-current voltage and that output the alternating-current voltage.

A control apparatus 70 operates operable units of the internal combustion engine 10 such as the throttle valve 14, the port injection valves 16, the in-cylinder injection valves 22, and the ignition devices 24 so as to control controlled variables of the internal combustion engine 10 to be controlled, namely, a torque, ratios among components of exhaust gas, and the like. Besides, the control apparatus 70 operates the first inverter 56 to control the torque that is a controlled variable of the first motor-generator 52 to be controlled. Besides, the control apparatus 70 operates the second inverter 58 to control the torque that is a controlled variable of the second motor-generator 54 to be controlled. In FIG. 1, operation signals MS1 to MS6 for the throttle valve 14, the port injection valves 16, the in-cylinder injection valves 22, the ignition devices 24, the first inverter 56, and the second inverter 58 are depicted. The control apparatus 70 refers to an intake air amount Ga detected by an airflow meter 80 and an output signal Scr of a crank angle sensor 82 to control the controlled variables of the internal combustion engine 10. Besides, the control apparatus 70 refers to a coolant temperature THW detected by a coolant temperature sensor 84, and an output signal Sp of an output-side rotational angle sensor 86 that senses a rotational angle of the ring gear R. Besides, the control apparatus 70 refers to a temperature Tb of the battery 59 detected by a temperature sensor 87, a charge-discharge current I of the battery 59 detected by a current sensor 88, and a terminal voltage Vb of the battery 59 detected by a voltage sensor 89. Besides, the control apparatus 70 refers to an output signal Sm1 of a first rotational angle sensor 90 that senses a rotational angle of the first motor-generator 52 to control the controlled variable of the first motor-generator 52. Besides, the control apparatus 70 refers to an output signal Sm2 of a second rotational angle sensor 92 that senses a rotational angle of the second motor-generator 54 to control the controlled variable of the second motor-generator 54. Besides, the control apparatus 70 refers to an accelerator operation amount ACCP that is a depression amount of an accelerator pedal detected by an accelerator sensor 94.

The control apparatus 70 is equipped with a CPU 72, a ROM 74, a peripheral circuit 76, and a communication line 78. The CPU 72, the ROM 74, and the peripheral circuit 76 can communicate with one another via the communication line 78. It should be noted herein that the peripheral circuit 76 includes a circuit that generates a clock signal prescribing the internal behavior thereof, an electric power supply circuit, a reset circuit, and the like. The control apparatus 70 controls the controlled variables through execution of a program stored in the ROM 74 by the CPU 72.

Among processes that are performed by a control system shown in FIG. 1, a regeneration process for the GPF 34, a process regarding the operation of the motor-generators, a process of operating the throttle valve 14, a boosting process, and a process of setting a timing of the regeneration process will be described hereinafter in this order.

(Regeneration Process for GPF 34)

Figure 2:
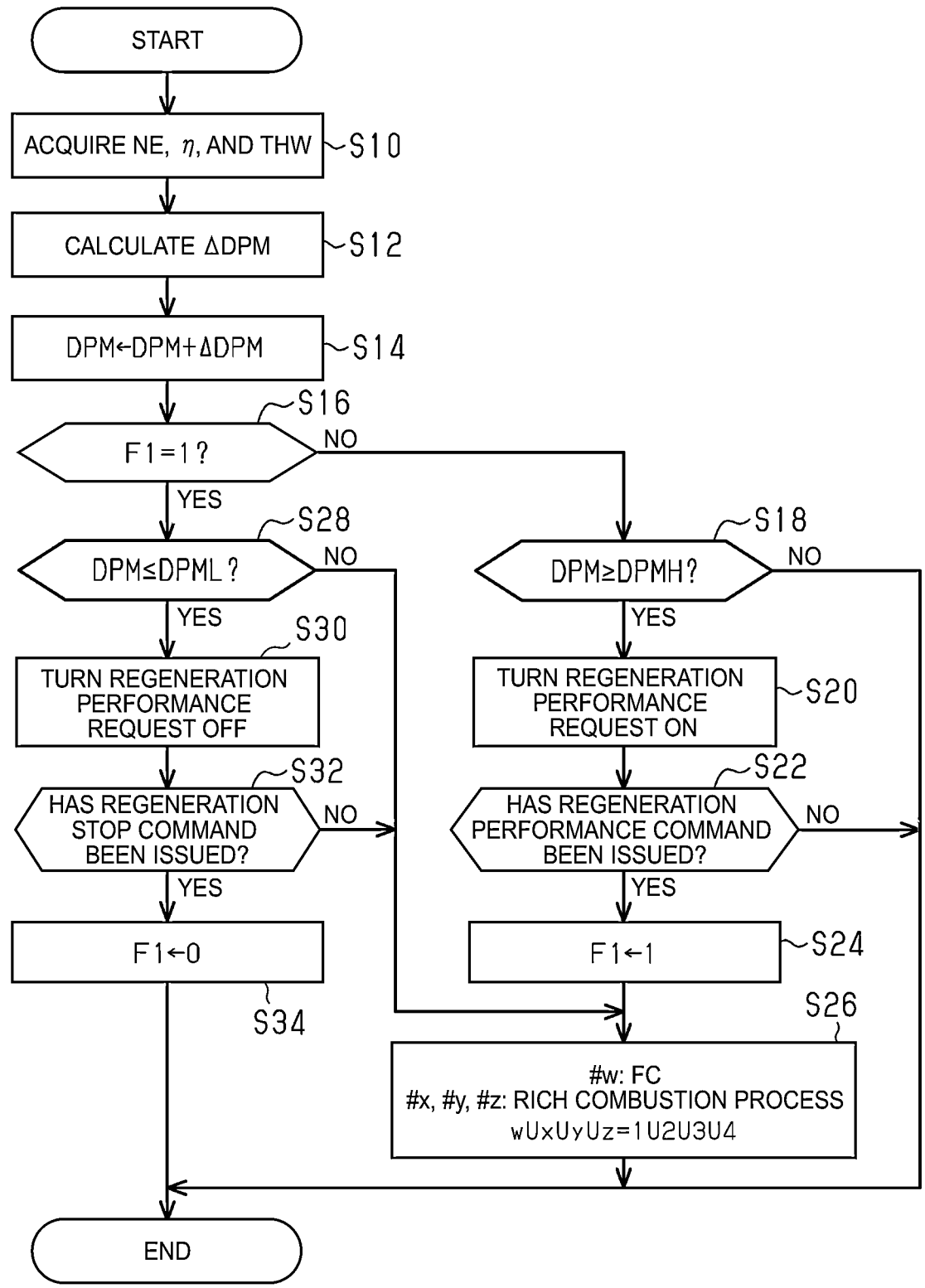
FIG. 2 is a flowchart showing the procedure of a process that is performed by the control apparatus according to the embodiment.

FIG. 2 shows the procedure of the regeneration process. The process shown in FIG. 2 is realized through repeated execution of a program stored in the ROM 74 by the CPU 72 on, for example, a predetermined cycle. Incidentally, each step number in each of the processes will be expressed hereinafter by a numeral preceded by "S".

In a series of processing steps shown in FIG. 2, the CPU 72 first acquires an engine rotational speed NE, a filling efficiency η, and the coolant temperature THW (S10). The engine rotational speed NE is calculated based on the output signal Scr by the CPU 72. The filling efficiency η is calculated based on the engine rotational speed NE and the intake air amount Ga by the CPU 72.

Subsequently, the CPU 72 calculates an update amount ΔDPM of a deposition amount DPM based on the engine rotational speed NE, the filling efficiency η, and the coolant temperature THW (S12). It should be noted herein that the deposition amount DPM is an amount of PM collected by the GPF 34. More specifically, the CPU 72 calculates an amount of PM in exhaust gas discharged to the exhaust passage 30, based on the engine rotational speed NE, the filling efficiency η, and the coolant temperature THW. Besides, the CPU 72 calculates a temperature of the GPF 34 based on the engine rotational speed NE and the filling efficiency η. The CPU 72 then calculates the update amount ΔDPM based on the amount of PM in exhaust gas and the temperature of the GPF 34. Incidentally, when the processing of S26 that will be described later is performed, the temperature of the GPF 34 and the update amount ΔDPM may be calculated based on an air-fuel ratio set through the processing of S26, or the like.

Subsequently, the CPU 72 updates the deposition amount DPM in accordance with the update amount ΔDPM (S14). Subsequently, the CPU 72 determines whether or not a regeneration flag F1 is "1" (S16). When being "1", the regeneration flag F1 indicates that a regeneration process for removing the PM in the GPF 34 through combustion is being performed. On the other hand, when being "0", the regeneration flag F1 indicates that the regeneration process is not being performed. If it is determined that the regeneration flag is "0" (NO in S16), the CPU 72 determines whether or not the deposition amount DPM is equal to or larger than a regeneration performance value DPMH (S18). The regeneration performance value DPMH is set to a value at which the removal of PM is desired on the grounds that the amount of PM collected by the GPF 34 is large.

If it is determined that the deposition amount DPM is equal to or larger than the regeneration performance value DPMH (YES in S18), the CPU 72 turns a regeneration performance request ON (S20). The regeneration performance request can be decided by a variable that can assume two values, namely, ON and OFF. Subsequently, the CPU 72 determines whether or not a regeneration performance command has been issued through the process of FIG. 7 that will be described later (S22). If it is determined that the regeneration performance command has been issued (YES in S22), the CPU 72 then assigns "1" to the regeneration flag F1 (S24). The CPU 72 then performs the regeneration process (S26). That is, the CPU 72 stops the injection of fuel from the port injection valve 16 and the in-cylinder injection valve 22 in one of the cylinders #1 to #4. Besides, the CPU 72 makes the air-fuel ratio of the air-fuel mixture in each of the combustion chambers 20 of the other cylinders richer than a theoretical air-fuel ratio. This is a process for removing the PM collected by the GPF 34 through combustion by discharging oxygen and unburnt fuel to the exhaust passage 30 and raising the temperature of the GPF 34. That is, the temperature of exhaust gas is raised through combustion of unburnt fuel in the three-way catalyst 32 or the like, by discharging oxygen and unburnt fuel to the exhaust passage 30. Thus, the temperature of the GPF 34 can be raised. Besides, the PM collected by the GPF 34 can be removed through combustion by supplying oxygen to the GPF 34.

The CPU 72 changes over the cylinder where combustion control is stopped, on a certain cycle. The cycle of changeover is, for example, a value obtained by multiplying one combustion cycle by a predetermined number. It should be noted herein that the predetermined number may be a number equal to or larger than 100. Incidentally, the cylinder where combustion control is stopped is depicted as a cylinder #w in FIG. 2. It should be noted herein that "w" assumes each of the four values "1" to "4" on the certain cycle.

On the other hand, if it is determined that the regeneration flag F1 is "1" (YES in S16), the CPU 72 determines whether or not the deposition amount DPM is equal to or smaller than a stop lower-limit guard value DPML (S28). The stop lower-limit guard value DPML is set to a value at which the regeneration process may be stopped on the grounds that the amount of PM collected by the GPF 34 is sufficiently small. If it is determined that the deposition amount DPM is larger than the stop lower-limit guard value DPML (NO in S28), the CPU 72 shifts to the processing of S26.

On the other hand, if it is determined that the deposition amount DPM is equal to or smaller than the stop lower-limit guard value DPML (YES in S28), the CPU 72 turns the regeneration performance request OFF (S30). Subsequently, the CPU 72 determines whether or not a regeneration stop command has been issued, through the process shown in FIG. 11 that will be described later (S32). If the regeneration stop command has not been issued (NO in S32), the CPU 72 shifts to the processing of S26. On the other hand, if it is determined that the regeneration stop command has been issued (YES in S32), the CPU 72 assigns "0" to the regeneration flag F1 (S34).

Incidentally, the CPU 72 temporarily ends the series of processing steps shown in FIG. 2 when the processing of S26 or S34 is completed, or when the result of the determination in the processing of S18 or S22 is negative.

(Process Regarding Operation of Motor-Generators)

Figure 3:
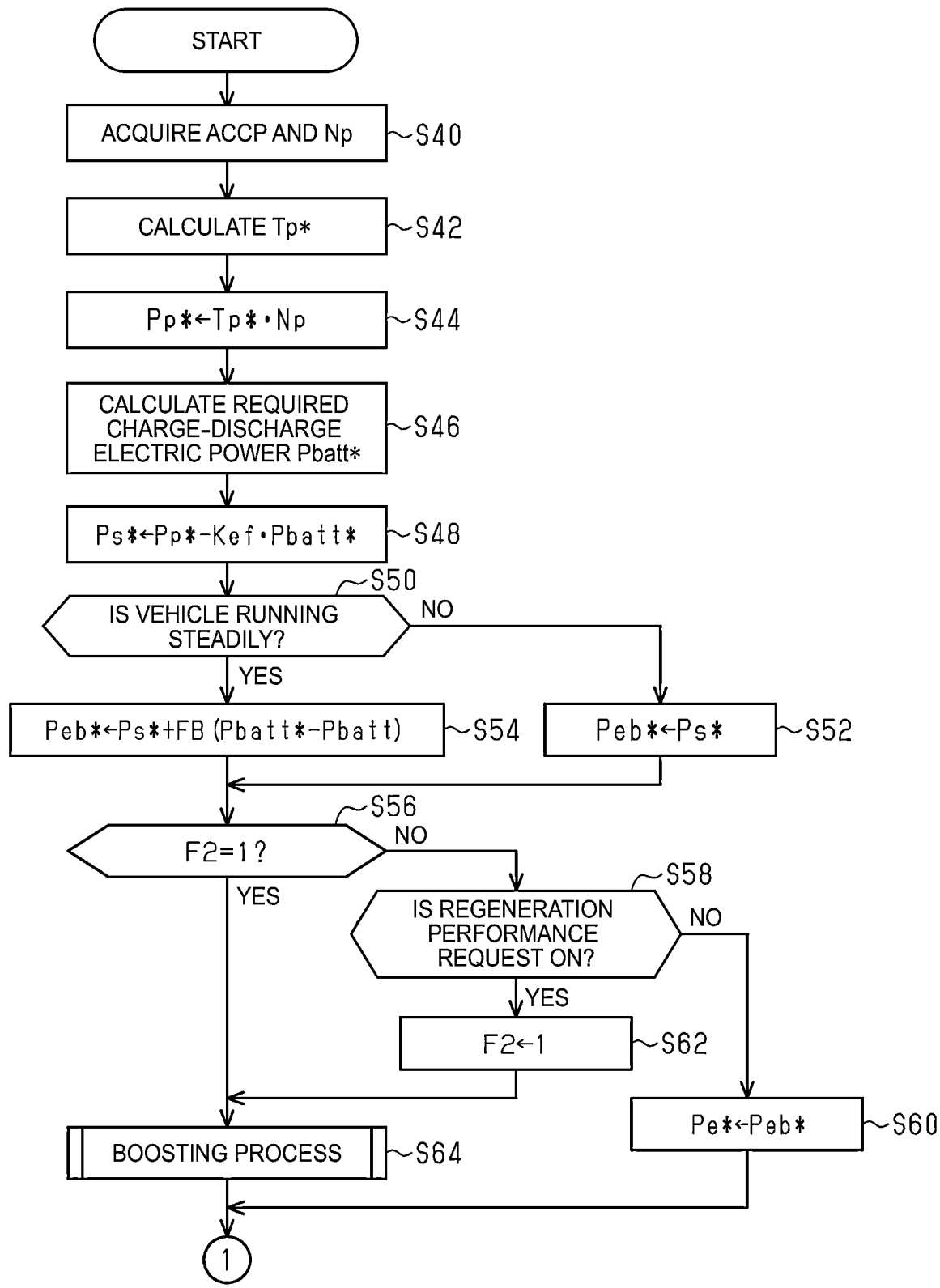
FIG. 3 is a flowchart showing the procedure of another process that is performed by the control apparatus according to the embodiment.
Figure 4:
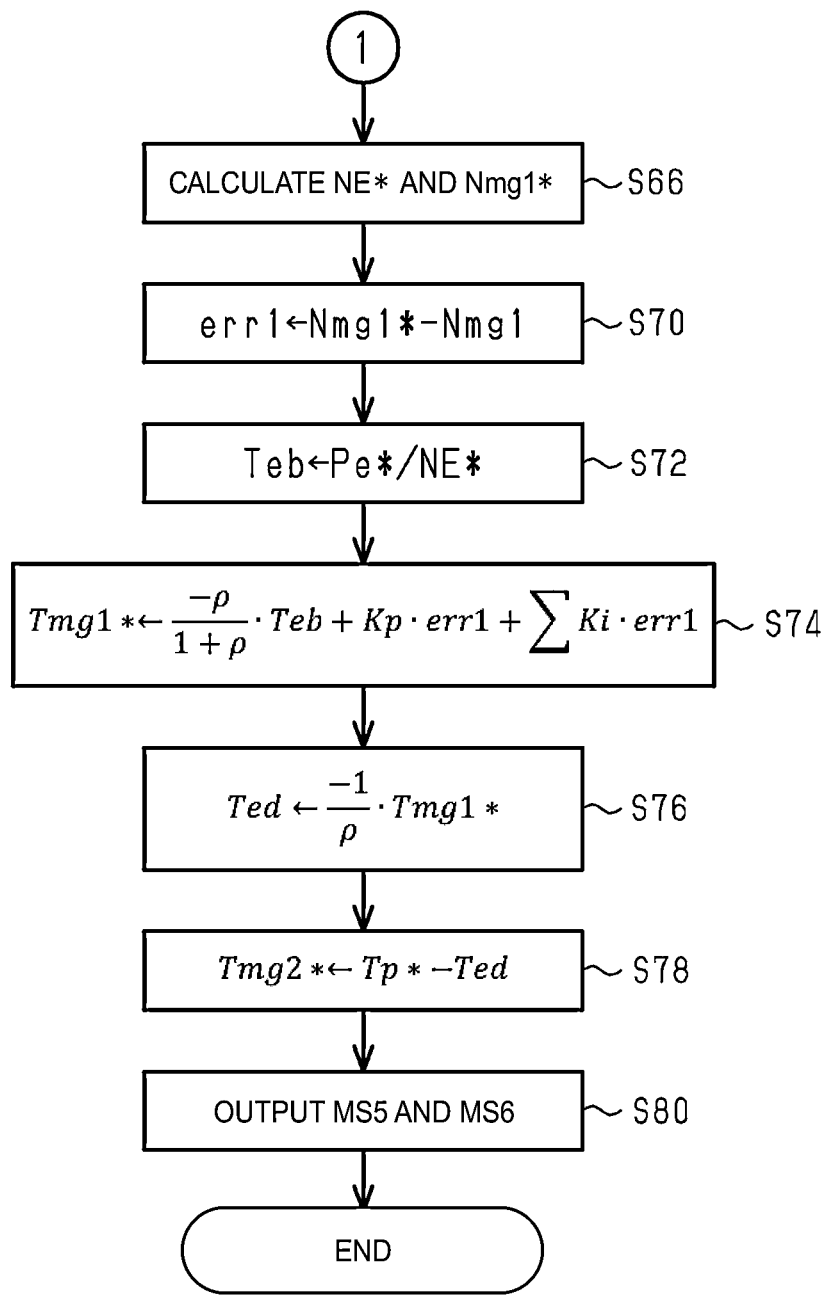
FIG. 4 is another flowchart showing the procedure of the process that is performed by the control apparatus according to the embodiment.

FIG. 3 and FIG. 4 show the procedure of the process regarding the operation of the motor-generators. The process shown in FIG. 3 and FIG. 4 is realized through repeated execution of a program stored in the ROM 74 by the CPU 72 on a predetermined cycle.

In a series of processing steps shown in FIG. 3 and FIG. 4, the CPU 72 first acquires the accelerator operation amount ACCP and an output-side rotational speed Np (S40). The output-side rotational speed Np is a rotational speed of the ring gear R. In other words, the output-side rotational speed Np is a variable indicating a vehicle speed. The output-side rotational speed Np is calculated based on the output signal Sp by the CPU 72.

The CPU 72 calculates a required driving torque Tp* that is a torque required of the driving wheels 60, based on the accelerator operation amount ACCP and the output-side rotational speed Np (S42). Subsequently, the CPU 72 assigns the product of the required driving torque Tp* and the output-side rotational speed Np to a running output Pp* (S44). Subsequently, the CPU 72 calculates a required charge-discharge electric power Pbatt* of the battery 59, based on a charging rate SOC of the battery 59 (S46). The required charge-discharge electric power Pbatt* is positive when the battery 59 is discharged. More specifically, the CPU 72 makes the required charge-discharge electric power Pbatt* negative to charge the battery 59 when the charging rate SOC is equal to or lower than a predetermined value. Incidentally, the charging rate SOC is calculated based on the charge-discharge current I and the terminal voltage Vb by the CPU 72.

Subsequently, the CPU 72 assigns a value obtained by subtracting the product of the required charge-discharge electric power Pbatt* and a conversion efficiency Kef from the running output Pp*, to a system output Ps* (S48). The CPU 72 then determines whether or not the vehicle is running steadily (S50). The CPU 72 determines that the vehicle is running steadily, for example, when the amount of change in the required driving torque Tp* per unit time is equal to or smaller than a predetermined value and the amount of change in the output-side rotational speed Np per unit time is equal to or smaller than a predetermined value.

If it is determined that the vehicle is not running steadily (NO in S50), the CPU 72 assigns the system output Ps* to a required engine output base value Peb* (S52). On the other hand, if it is determined that the vehicle is running steadily (YES in S50), the CPU 72 assigns a value obtained by adding a feedback correction amount FB to the system output Ps*, to the required engine output base value Peb* (S54). The feedback correction amount FB is an operation amount for controlling the charge-discharge electric power Pbatt of the battery 59 to the required charge-discharge electric power Pbatt* through feedback. It should be noted herein that the actual charge-discharge electric power Pbatt of the battery 59 is calculated as the product of the charge-discharge current I and the terminal voltage Vb by the CPU 72. When a value obtained by subtracting the actual charge-discharge electric power from the required charge-discharge electric power Pbatt* is smaller than a lower limit, the CPU 72 increases the feedback correction amount FB through correction by a predetermined amount. On the other hand, when the value obtained through subtraction is larger than an upper limit, the CPU 72 decreases the feedback correction amount FB through correction by the predetermined amount.

When the processing of S52 or S54 is completed, the CPU 72 determines whether or not a boosting flag F2 is "1" (S56). If it is determined that the boosting flag F2 is "0" (NO in S56), the CPU 72 determines whether or not the regeneration performance request is ON (S58). If the regeneration performance request is OFF (NO in S58), the CPU 72 assigns the required engine output base value Peb* to a required engine output Pe* (S60).

On the other hand, if it is determined that the regeneration performance request is ON (YES in S58), the CPU 72 assigns "1" to the boosting flag F2 (S62).

The CPU 72 performs the boosting process when the result of the determination in the processing of S56 is positive or when the processing of S62 is completed (S64).

When the processing of S60 or S64 is completed, the CPU 72 calculates a target engine rotational speed NE* and a first target rotational speed Nmg1* (S66 of FIG. 4). It should be noted herein that the target engine rotational speed NE* is a target value of the engine rotational speed NE. Besides, the first target rotational speed Nmg1* is a target value of a first rotational speed Nmg1 that is a rotational speed of the rotary shaft 52a of the first motor-generator 52. More specifically, the processing of S66 is performed as follows.

The CPU 72 first calculates the target engine rotational speed NE* based on the required engine output Pe*. This can be realized by computing the target engine rotational speed NE* with reference to a map by the CPU 72, with map data stored in advance in the ROM 74. It should be noted herein that the map data are data having the required engine output Pe* as an input variable and the target engine rotational speed NE* as an output variable. Incidentally, the map data are paired data including discrete values of the input variable and values of the output variable corresponding to the values of the input variable respectively. Besides, the computation with reference to the map may be a process of adopting a corresponding value of the output variable in the map data as a computation result when a value of the input variable coincides with any one of the values of the input variable in the map data. Besides, the computation with reference to the map may be a process of adopting a value obtained through interpolation of the values of the output variable included in the map data as a computation result when a value of the input variable does not coincide with any one of the values of the input variable in the map data.

Subsequently, the CPU 72 calculates the first target rotational speed Nmg1* based on the following equation.

$$NE^*=\{\rho/(1+\rho)\}\cdot Nmg1^*+\{1/(1+\rho)\}\cdot Np$$

It should be noted, however, that a planetary gear ratio $\rho$ in the above equation is a value obtained by dividing the number of teeth of the sun gear S by the number of teeth of the ring gear R.

Subsequently, the CPU 72 assigns a value obtained by subtracting the first rotational speed Nmg1 from the first target rotational speed Nmg1* to an error err1 (S70). Incidentally, the first rotational speed Nmg1 is calculated based on the output signal Sm1 by the CPU 72.

Subsequently, the CPU 72 assigns a value obtained by dividing the required engine output Pe* by the target engine rotational speed NE* to an engine torque base value Teb (S72).

Subsequently, the CPU 72 calculates a first required torque Tmg1* (S74). The first required torque Tmg1* is a required torque of the first motor-generator 52. The CPU 72 defines the first required torque Tmg1* as the sum of an open loop term and a feedback term. It should be noted herein that the open loop term is "$\{-\rho/(1+\rho)\}\cdot Teb$". It should be noted herein that "$-\rho/(1+\rho)$" is a coefficient for converting a torque of the carrier C into a torque of the sun gear S. On the other hand, the feedback term is an operation amount for controlling the first rotational speed Nmg1 through feedback. The feedback term is the sum of an output value of a proportional element and an output value of an integral element. The output value of the proportional element is a value obtained by multiplying the error err1 by a proportional gain Kp. The output value of the integral element is an integrated value of values obtained by multiplying the error err1 by an integral gain Ki.

Subsequently, the CPU 72 assigns a value obtained by multiplying "$(-1)/\rho$" by the first required torque Tmg1* to a direct torque Ted (S76). It should be noted herein that "$(-1)/\rho$" is a coefficient for converting a torque of the sun gear S into a torque of the ring gear R. The direct torque Ted is a calculational torque that is assumed to be applied to the ring gear R.

Subsequently, the CPU 72 calculates a second required torque Tmg2* by subtracting the direct torque Ted from the required driving torque Tp* (S78). It should be noted herein that a value obtained by subtracting the direct torque Ted from the required driving torque Tp* is a deficiency in the output of the ring gear R in making the torque of the driving wheels 60 equal to the required driving torque Tp*.

Subsequently, the CPU 72 outputs an operation signal MS5 to the first inverter 56, and outputs an operation signal MS6 to the second inverter 58 (S80). That is, the CPU 72 operates the first inverter 56 to control the torque of the first motor-generator 52 to the first required torque Tmg1*. Besides, the CPU 72 operates the second inverter 58 to control the torque of the second motor-generator 54 to the second required torque Tmg2*.

Incidentally, the CPU 72 temporarily ends the series of processing steps shown in FIG. 3 and FIG. 4 when the processing of S80 is completed.

(Process of Operating Throttle Valve 14)

Figure 5:
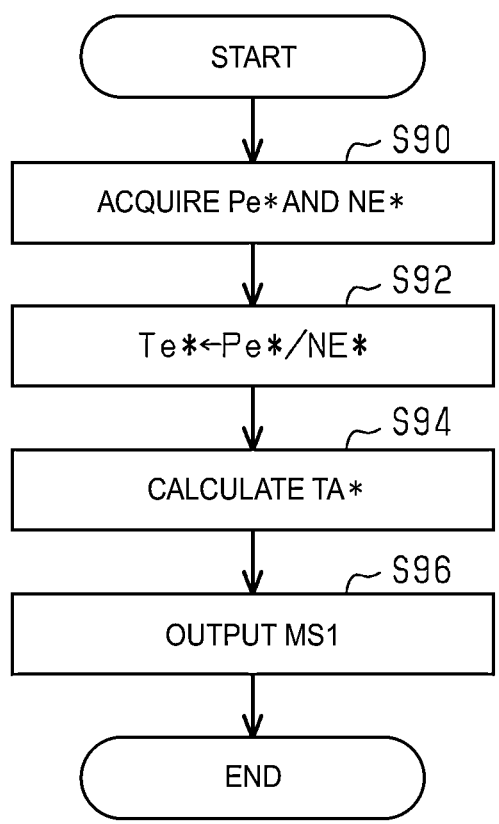
FIG. 5 is a flowchart showing the procedure of still another process that is performed by the control apparatus according to the embodiment.

FIG. 5 shows the procedure of the process regarding the operation of the throttle valve 14. The process shown in FIG. 5 is realized through repeated execution of a program stored in the ROM 74 by the CPU 72 on, for example, a predetermined cycle.

In a series of processing steps shown in FIG. 5, the CPU 72 first acquires the required engine output Pe* and the target engine rotational speed NE* (S90). The CPU 72 then assigns a value obtained by dividing the required engine output Pe* by the target engine rotational speed NE*, to the required engine torque Te* (S92). Subsequently, the CPU 72 calculates a throttle opening degree command value TA* that is a command value of an opening degree of the throttle valve 14, based on the required engine torque Te* (S94). The throttle opening degree command value TA* calculated herein is a value for making the torque of the internal combustion engine 10 equal to the required engine torque Te* when combustion control is performed in all the cylinders #1 to #4. The CPU 72 then outputs an operation signal MS1 to the throttle valve 14 to control the opening degree of the throttle valve 14 to the throttle opening degree command value TA* (S96).

Incidentally, the CPU 72 temporarily ends the series of processing steps shown in FIG. 5 when the processing of S96 is completed.

(Details of Boosting Process)

Figure 6:
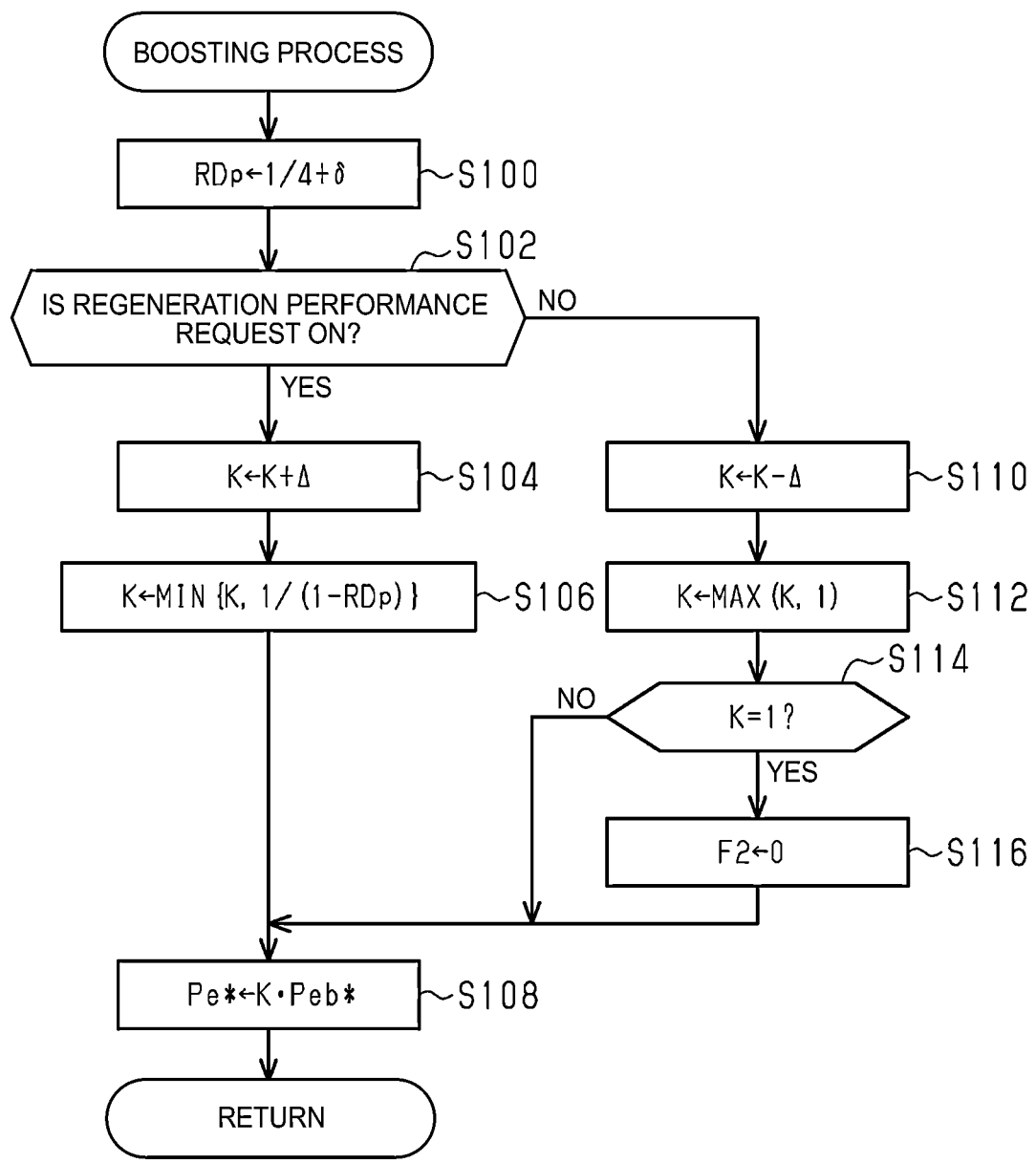
FIG. 6 is a flowchart showing the procedure of still another process that is performed by the control apparatus according to the embodiment.

FIG. 6 shows the details of the processing of S64.

In a series of processing steps shown in FIG. 6, the CPU 72 first assigns a value obtained by adding a predetermined amount δ to "¼" to a fall variable RDp (S100). The fall variable RDp is a variable indicating a ratio of fall in the output of the internal combustion engine 10 resulting from the regeneration process. Since combustion control is stopped only in the cylinder #w through the regeneration process, the ratio of fall in output is considered to be "¼" approximately in comparison with a case combustion control is not stopped. In fact, however, the ratio of fall in output tends to be smaller than "¼" as a result of a difference from a case where combustion control is performed in all the cylinders #1 to #4. Thus, the amount corresponding to the difference is expressed by the predetermined amount δ.

Subsequently, the CPU 72 determines whether or not the regeneration performance request is ON (S102). If it is determined that the regeneration performance request is ON (YES in S102), the CPU 72 then assigns a value obtained by adding a predetermined amount Δ to an increase coefficient K for boosting the required engine output Pe* above the required engine output base value Peb*, to the increase coefficient K (S104). This process is a process for gradually increasing the required engine output Pe*. That is, in compensating for a fall in output caused by stopping combustion control in one of the cylinders #1 to #4, the increase coefficient K needs to be "1/(1−RDp)". Therefore, the increase coefficient K can be gradually increased to "1/(1−RDp)" by making the predetermined amount Δ equal to or larger than zero and smaller than "1/(1−RDp)". Incidentally, the initial value of the increase coefficient K at a time point when the regeneration performance request is switched to ON is "1".

Subsequently, the CPU 72 assigns the smaller one of the increase coefficient K and "1/(1−RDp)" to the increase coefficient K (S106). This processing is designed to make the upper limit of a gradual increase in the increase coefficient K equal to "1/(1−RDp)". The CPU 72 then assigns a value obtained by multiplying the required engine output base value Peb* by the increase coefficient K, to the required engine output Pe* (S108).

On the other hand, if it is determined that the regeneration performance request is OFF (NO in S102), the CPU 72 subtracts the predetermined amount Δ from the increase coefficient K (S110). This processing is designed to gradually decrease the increase coefficient K. Subsequently, the CPU 72 assigns the larger one of the increase coefficient K and "1" to the increase coefficient K (S112). This processing is designed to gradually decrease the increase coefficient K so that the increase coefficient K converges to "1". The CPU 72 then determines whether or not the increase coefficient K is "1" (S114). If it is determined that the increase coefficient K is "1" (YES in S114), the CPU 72 assigns "0" to the boosting flag F2 (S116).

The CPU 72 shifts to the processing of S108 when the processing of S116 is completed or when the result of the determination in the processing of S114 is negative.

Incidentally, the CPU 72 temporarily ends the series of processing steps shown in FIG. 6 when the processing of S108 is completed.

(Process of Setting Timing of Regeneration Process)

Figure 7:
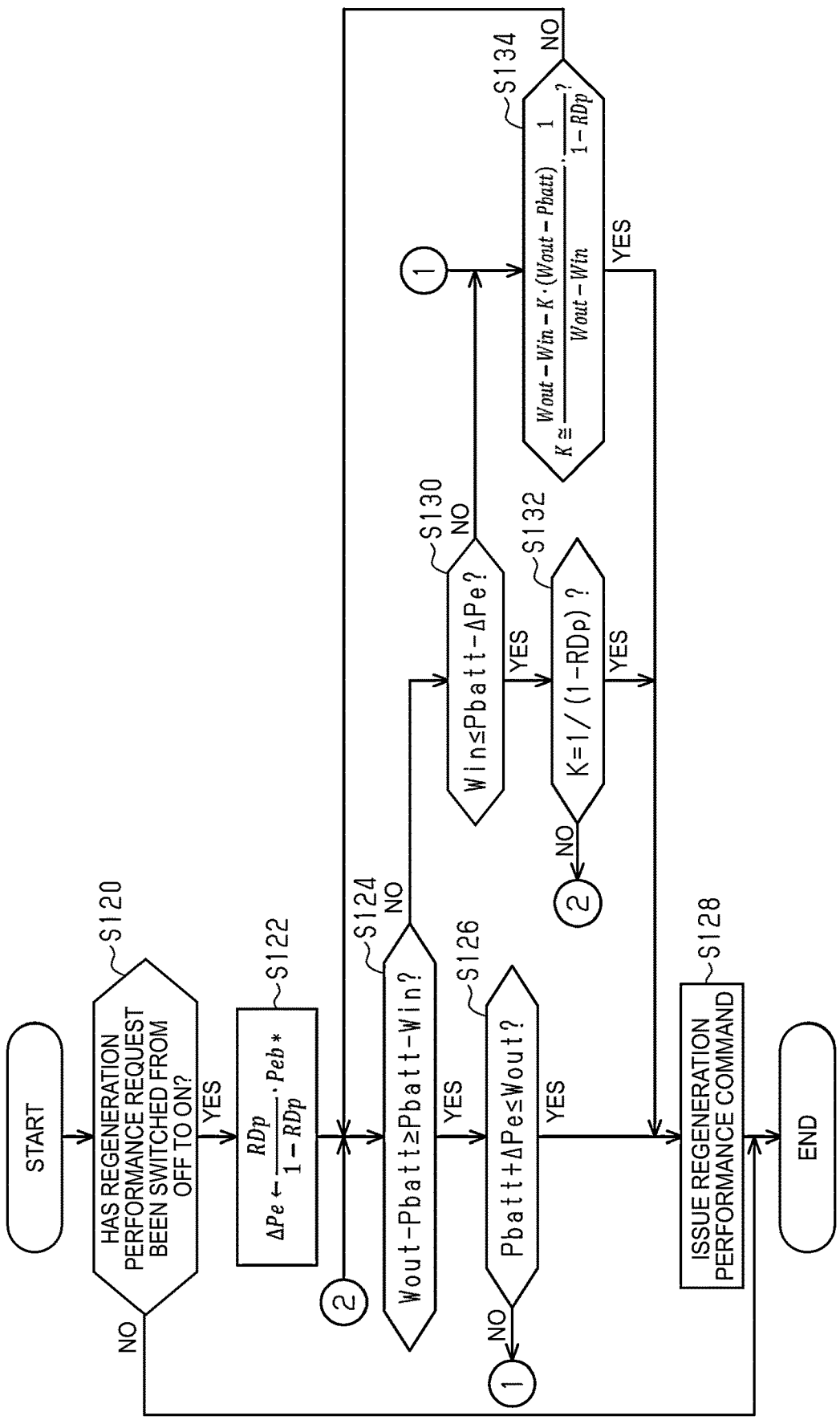
FIG. 7 is a flowchart showing the procedure of still another process that is performed by the control apparatus according to the embodiment.

FIG. 7 shows the procedure of the process regarding the generation of a regeneration start command The process shown in FIG. 7 is realized through repeated execution of a program stored in the ROM 74 by the CPU 72 on, for example, a predetermined cycle.

In a series of processing steps shown in FIG. 7, the CPU 72 first determines whether or not the regeneration performance request has been switched from OFF to ON (S120). If it is determined that the regeneration performance request has been switched (YES in S120), the CPU 72 assigns a value obtained by multiplying the required engine output base value Peb* by "RDp/(1−RDp)" to an output increase amount ΔPe (S122). The output increase amount ΔPe indicates an amount of increase for compensating for a fall in the output of the internal combustion engine 10 caused by stopping combustion control in the cylinder #w.

Subsequently, the CPU 72 determines whether or not a value obtained by subtracting the charge-discharge electric power Pbatt from a discharge upper limit Wout is equal to or larger than a value obtained by subtracting a charge upper limit Win from the charge-discharge electric power Pbatt (S124).

The discharge upper limit Wout is an upper limit of the discharge electric power of the battery 59. The discharge upper limit Wout is set based on the charging rate SOC and the temperature Tb by the CPU 72. That is, the CPU 72 sets the discharge upper limit Wout larger when the charging rate SOC is high than when the charging rate SOC is low, in the case where the temperature Tb remains unchanged. Besides, the CPU 72 calculates the discharge upper limit Wout smaller when the temperature Tb is higher or lower than a predetermined range than when the temperature Tb is within the predetermined range. Incidentally, when the temperature Tb is out of the predetermined range, the discharge upper limit Wout may be reduced as the temperature Tb rises or falls.

The charge upper limit Win is an upper limit of the charge electric power of the battery 59. In the present embodiment, while the sign of the charge-discharge electric power Pbatt is positive on the discharge side, the charge upper limit Win is a negative value. The charge upper limit Win is set based on the charging rate SOC and the temperature Tb by the CPU 72. That is, the CPU 72 sets the absolute value of the charge upper limit Win larger when the charging rate SOC is low than when the charging rate SOC is high, in the case where the temperature Tb remains unchanged. Besides, the CPU 72 calculates the absolute value of the charge upper limit Win as a value that is smaller when the temperature Tb is higher or lower than the predetermined range than when the temperature Tb is within the predetermined range. Incidentally, when the temperature Tb is out of the predetermined range, the absolute value of the charge upper limit Win may be reduced as the temperature Tb rises or falls.

The processing of S124 is designed to determine which one of an increase in output and a decrease in output is more advantageous when the second motor-generator 54 covers the output for compensating for fluctuations in the output of the internal combustion engine 10 resulting from the start of performance of the regeneration process.

If it is determined that the value obtained by subtracting the charge-discharge electric power Pbatt from the discharge upper limit Wout is equal to or larger than the value obtained by subtracting the charge upper limit Win from the charge-discharge electric power Pbatt (YES in S124), the CPU 72 determines whether or not the value obtained by adding the output increase amount ΔPe to the charge-discharge electric power Pbatt is equal to or smaller than the discharge upper limit Wout (S126). This processing is designed to determine whether or not the output of the second motor-generator 54 can be increased by the output increase amount ΔPe. If it is determined that the value obtained through addition is equal to or smaller than the discharge upper limit Wout (YES in S126), the CPU 72 commands the performance of the regeneration process (S128). That is, in a situation where the result of the determination in the processing of S126 is positive, the CPU 72 commands the performance of the regeneration process as soon as the regeneration performance request is switched from OFF to ON. Thus, the CPU 72 makes a positive determination in S22 of FIG. 2, and hence starts the regeneration process. Incidentally, when the regeneration performance request is turned ON, the process of gradually increasing the required engine output Pe* shown in FIG. 6 is started. Therefore, in the situation where the result of the determination in the processing of S126 is positive, the regeneration process and the process of gradually increasing the required engine output Pe* are performed immediately.

Figure 8A:
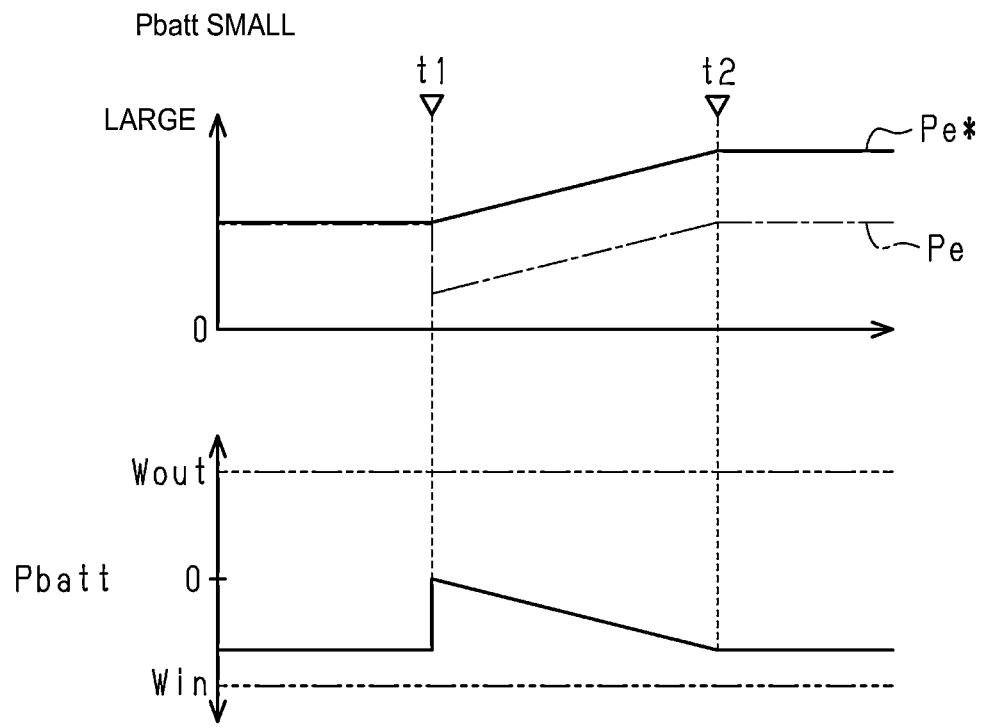
FIG. 8A is a time chart exemplifying a process that is performed by the control apparatus according to the embodiment.

FIG. 8A exemplifies a case where the result of the determination in the processing of each of S124 and S126 is positive on the grounds that the charge-discharge electric power Pbatt is negative and the absolute value thereof is large. In this case, the process of gradually increasing the required engine output Pe* is started, and the regeneration process is started at time t1. When the regeneration process is started, the engine output Pe decreases stepwise by an amount corresponding to the fall variable RDp with respect to the required engine output Pe*. When the engine output Pe decreases, the torque applied to the carrier C falls. Thus, the torque of the sun gear S falls. Thus, the absolute value of the value obtained by subtracting the first rotational speed Nmg1 from the first target rotational speed Nmg1* increases, so the first required torque Tmg1* calculated through the processing of S74 is changed. Thus, the second required torque Tmg2* calculated through the processing of S78 is then increased.

Therefore, the charge-discharge electric power Pbatt rapidly increases at and after time t1. However, since there is a sufficient difference between the charge-discharge electric power Pbatt at and before time t1 and the discharge upper limit Wout, the charge-discharge electric power Pbatt does not exceed the discharge upper limit Wout.

Incidentally, time t2 indicates a timing when the gradual increase process is completed. When the required engine output Pe* is increased gradually, the throttle opening degree command value TA* set through the processing of S94 increases gradually. Therefore, the filling efficiency η also increases gradually. Accordingly, the amount of combustion energy in that one of the cylinders #1 to #4 in which combustion control is not stopped increases gradually. Then at time t1, the engine output Pe becomes equal to the required engine output base value Peb*.

Figure 8B:
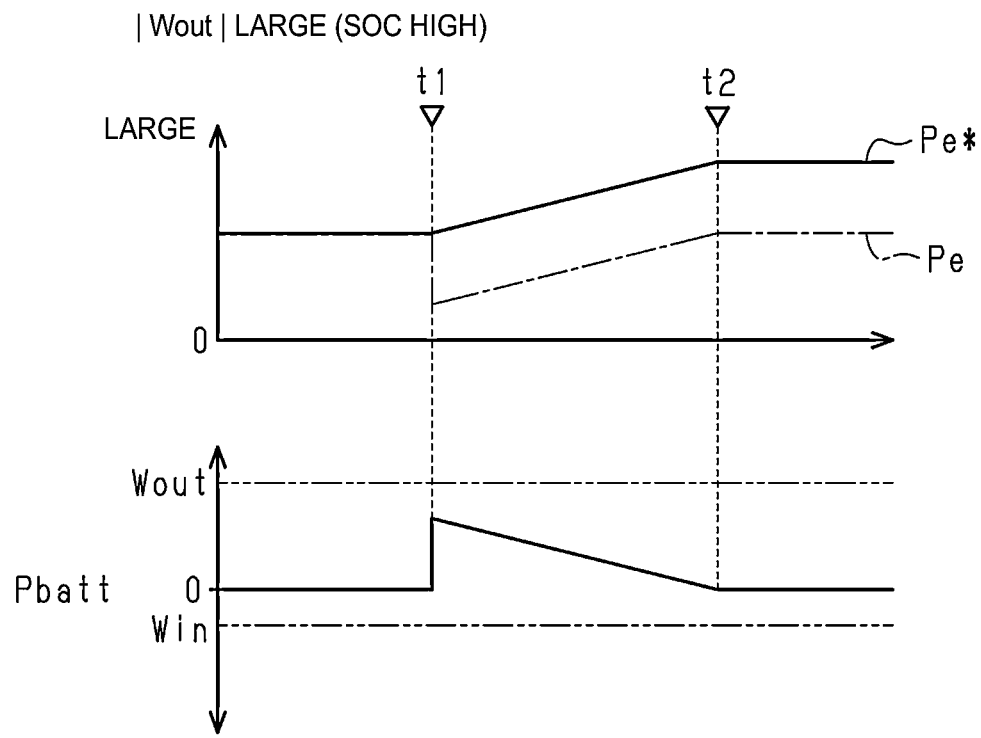
FIG. 8B is another time chart exemplifying the process that is performed by the control apparatus according to the embodiment.

FIG. 8B exemplifies a case where the result of the determination in the processing of each of S124 and S126 is positive on the grounds that the charging rate SOC is high and hence the discharge upper limit Wout is large. In FIG. 8B as well, the process of gradually increasing the required engine output Pe* is started, and the regeneration process is started at time t1.

Returning to FIG. 7, if the result of the determination in the processing of S124 is negative, the CPU 72 determines whether or not the value obtained by subtracting the output increase amount ΔPe from the charge-discharge electric power Pbatt is equal to or larger than the charge upper limit Win (S130). If it is determined that the value obtained through subtraction is equal to or larger than the charge upper limit Win (YES in S130), the CPU 72 then determines whether or not the increase coefficient K is "1/(1−RDp)" (S132). If it is determined that the increase coefficient K is "1/(1−RDp)" (YES in S132), the CPU 72 then shifts to the processing of S128. That is, if the result of the determination in the processing of S130 is positive, the performance of the regeneration process is commanded through completion of the process of gradually increasing the required engine output Pe*.

Figure 9A:
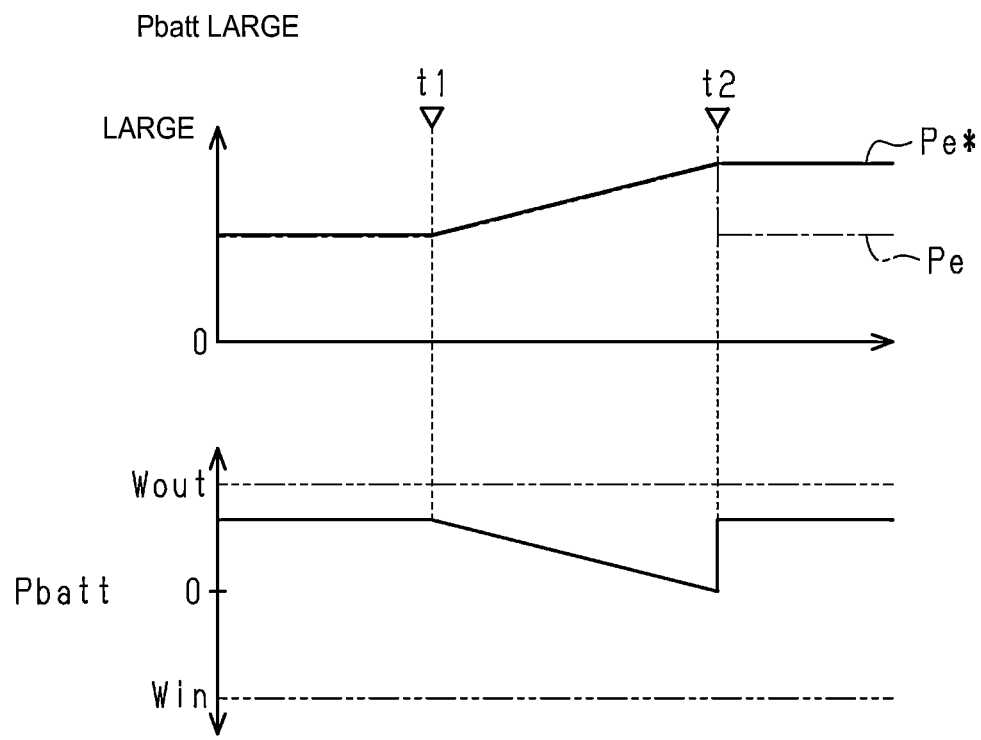
FIG. 9A is a time chart exemplifying another process that is performed by the control apparatus according to the embodiment.

FIG. 9A exemplifies a case where the result of the determination in the processing of S124 is negative and the result of the determination in the processing of S130 is positive on the grounds that the charge-discharge electric power Pbatt is large. In this case, after the process of gradually increasing the required engine output Pe* is started at time t1, the regeneration process is started at time t2 when the gradual increase process is completed.

When the gradual increase process is started, the engine output Pe increases gradually, and hence the torque applied to the carrier C also increases gradually. Thus, the torque of the sun gear S increases gradually. Thus, the absolute value of the value obtained by subtracting the first rotational speed Nmg1 from the first target rotational speed Nmg1* increases, so the first required torque Tmg1* calculated through the processing of S74 is changed. Thus, the second required torque Tmg2* calculated through the processing of S78 then decreases gradually. Thus, the charge-discharge electric power Pbatt decreases gradually.

Then, at time t2 when the regeneration process is started, the engine output Pe decreases stepwise to become equal to the required engine output base value Peb*. A rapid decrease in the output of the internal combustion engine 10 is compensated for by an increase in the output of the second motor-generator 54. Therefore, the charge-discharge electric power Pbatt rapidly increases at and after time t2.

Figure 9B:
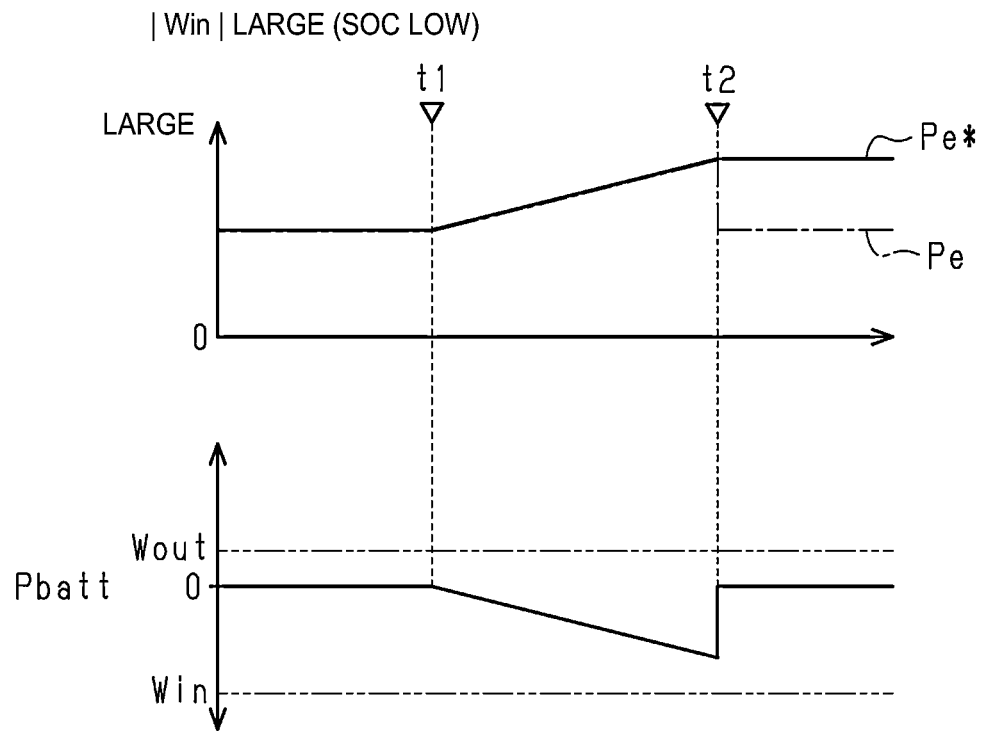
FIG. 9B is another time chart exemplifying the process that is performed by the control apparatus according to the embodiment.

FIG. 9B exemplifies a case where the result of the determination in the processing of S124 is negative and the result of the determination in the processing of S130 is positive on the grounds that the charging rate SOC is low and hence the absolute value of the charge upper limit Win is large. In FIG. 9B as well, after the process of gradually increasing the required engine output Pe* is started at time t1, the regeneration process is started at time t2.

Returning to FIG. 7, if the result of the determination in the processing of S126 or S130 is negative, the CPU 72 determines whether or not the increase coefficient K has become equal to "{Wout−Win−R·(Wout−Pbatt)}/(Wout−Win)·{1/(1−RDp)}" (S134). If the result of the determination in the processing of S134 is positive (YES in S134), the CPU 72 then shifts to the processing of S128. That is, the CPU 72 issues a command to perform the regeneration process during the gradual increase process.

Figure 10A:
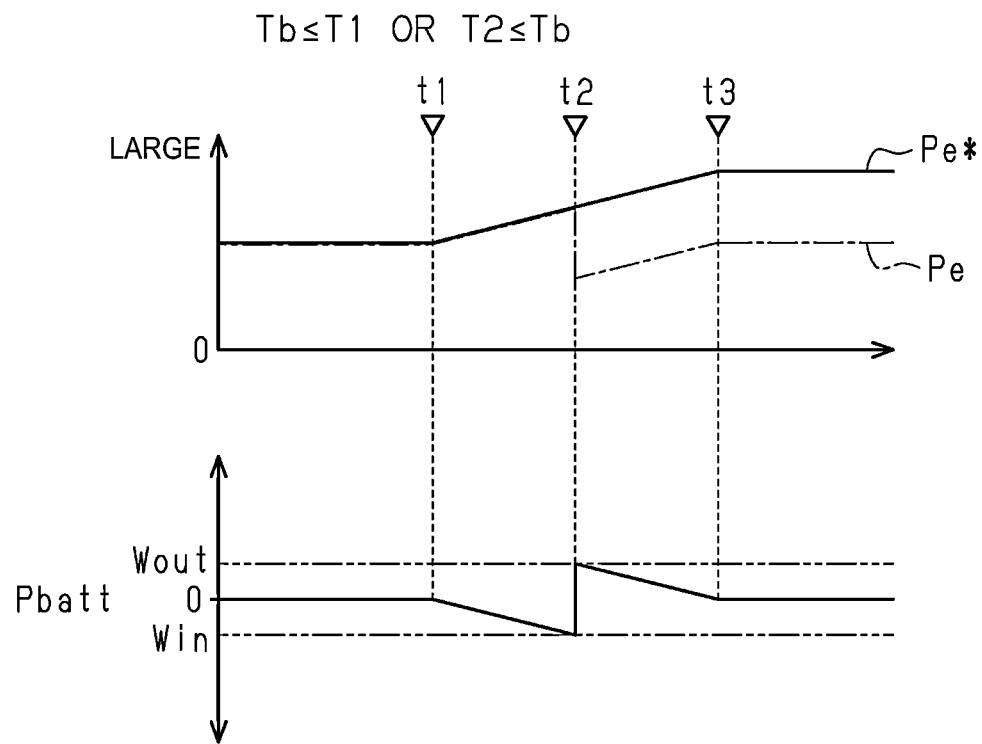
FIG. 10A is a time chart exemplifying still another process that is performed by the control apparatus according to the embodiment.

FIG. 10A exemplifies a case where the result of the determination in S126 or S130 is negative on the grounds that the absolute values of both the discharge upper limit Wout and the charge upper limit Win are small. It is assumed herein that the absolute values of both the discharge upper limit Wout and the charge upper limit Win are small because the temperature Tb is equal to or lower than a first temperature T1 or equal to or higher than a second temperature T2 (>T1).

As shown in FIG. 10A, after the gradual increase process is started at time t1, the gradual increase process is completed at time t3. The regeneration process is started at time t2 between time t1 and time t3. The output of the second motor-generator 54 decreases gradually as the engine output Pe increases gradually, until the regeneration process is started after the start of the gradual increase process. Thus, the charge-discharge electric power Pbatt decreases gradually. In contrast, when the regeneration process is started, the engine output Pe decreases stepwise. This fall in output is compensated for by the second motor-generator 54. Therefore, the charge-discharge electric power Pbatt increases rapidly. Then after that, the charge-discharge electric power Pbatt decreases gradually as the engine output Pe increases gradually.

In this manner, the charge-discharge electric power Pbatt can be restrained from greatly changing as a result of the performance of the regeneration process, by starting the regeneration process during the gradual increase process. In particular, the processing of S134 is set such that the charge-discharge electric power Pbatt can be confined to the utmost within a range equal to or smaller than the discharge upper limit Wout and equal to or larger than the charge upper limit Win. That is, the processing of S134 is set such that the timing of starting the regeneration process is retarded as the difference between the charge upper limit Win and the charge-discharge electric power Pbatt increases.

In concrete terms, the right timing in the period in which the gradual increase process is performed is decided by the following equation, in accordance with the relative magnitudes of the difference between the discharge upper limit Wout and the charge-discharge electric power Pbatt, and the difference between the charge upper limit Win and the charge-discharge electric power Pbatt.

$$(K-1):\{1/(1-RDp)\}-K=(Pbatt-Win):(Wout-Pbatt)$$

Returning to FIG. 7, if the result of the determination in the processing of S132 or S134 is negative, the CPU 72 returns to the processing of S124. This takes into account that the state of the battery 59 may change in the period until the timing when the result of the determination in the processing of S132 or S134 becomes positive.

Figure 10B:
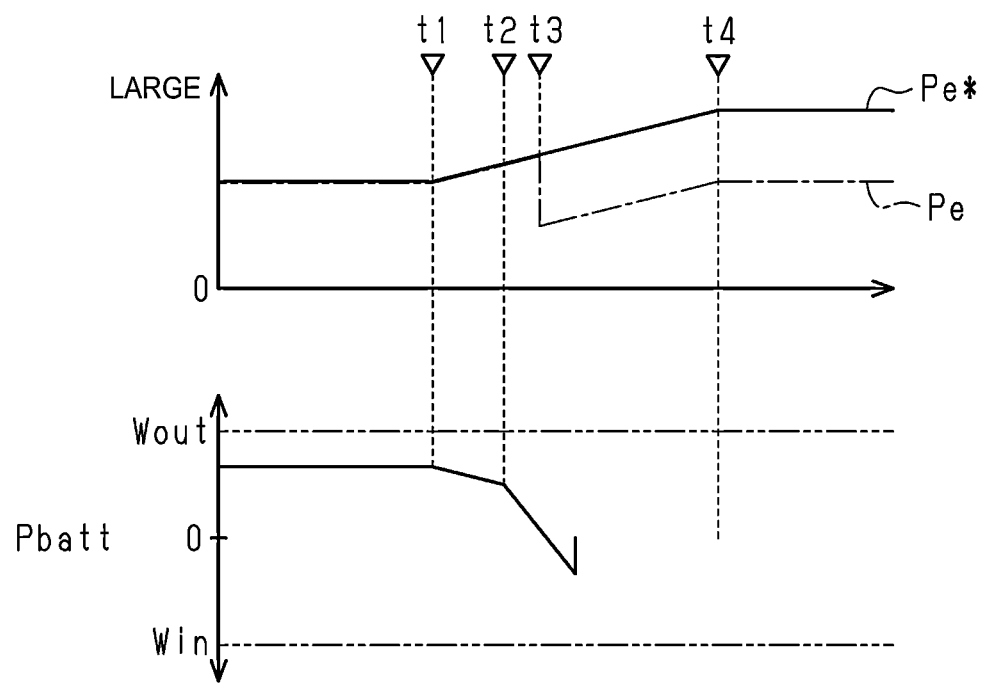
FIG. 10B is another time chart exemplifying the process that is performed by the control apparatus according to the embodiment.

FIG. 10B shows a case where the charge-discharge electric power Pbatt rapidly decreases after the result of the determination in the processing of S130 becomes positive. In FIG. 10B, the CPU 72 starts the process of gradually increasing the required engine output Pe* at time t1. At this time point, the result of the determination in the processing of S130 is positive, and the result of the determination in the processing of S132 is negative. Then at and after time t2, the charge-discharge electric power Pbatt greatly decreases as a result of a change in the operating state of the vehicle. Thus, the result of the determination in the processing of S124 or S126 becomes positive at time t3, so the regeneration process is started. Incidentally, time t4 is a timing when the gradual increase process is completed. In other words, time t4 is a timing when the result of the determination in the processing of S132 becomes positive.

Incidentally, the CPU 72 temporarily ends the series of processing steps shown in FIG. 7 when the processing of S128 is completed or when the result of the determination in the processing of S120 is negative.

Figure 11:
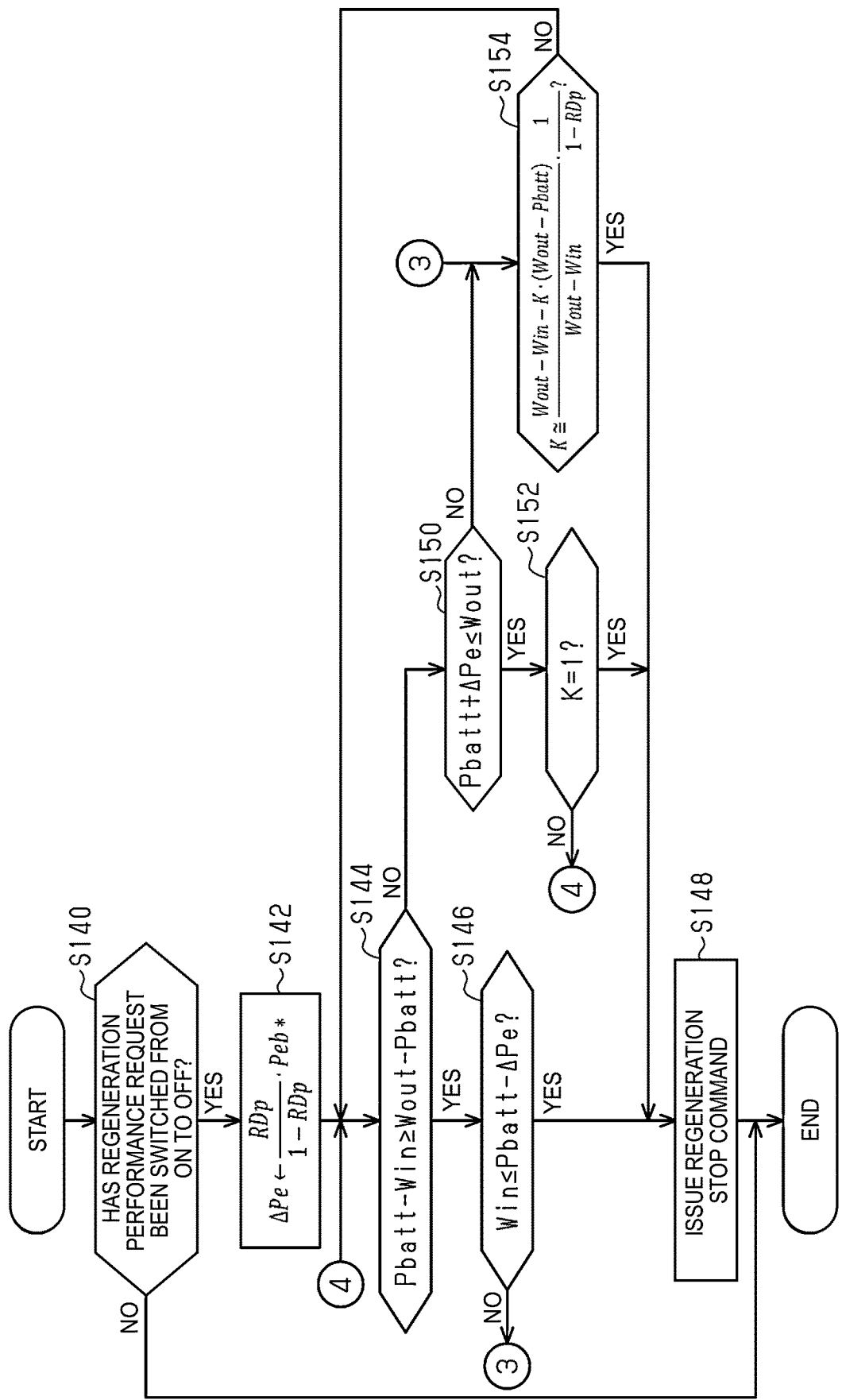
FIG. 11 is a flowchart showing the procedure of still another process that is performed by the control apparatus according to the embodiment.

FIG. 11 shows the procedure of the process regarding the generation of a regeneration stop command The process shown in FIG. 11 is realized through repeated execution of a program stored in the ROM 74 by the CPU 72 on, for example, a predetermined cycle.

In the series of processing steps shown in FIG. 11, the CPU 72 determines whether or not the regeneration performance request has been switched from ON to OFF (S140). If it is determined that the regeneration performance request has been switched (YES in S140), the CPU 72 calculates the output increase amount ΔPe in the same manner as in the processing of S122 (S142).

Subsequently, the CPU 72 determines whether or not the value obtained by subtracting the charge upper limit Win from the charge-discharge electric power Pbatt is equal to or larger than a value obtained by subtracting the charge-discharge electric power Pbatt from the discharge upper limit Wout (S144). The processing of S144 is designed to determine which one of an increase in output or a decrease in output is advantageous when the second motor-generator 54 covers the output for compensating for fluctuations in the output of the internal combustion engine 10 caused by stopping the performance of the regeneration process.

If it is determined that the value obtained by subtracting the charge upper limit Win from the charge-discharge electric power Pbatt is equal to or larger than the value obtained by subtracting the charge-discharge electric power Pbatt from the discharge upper limit Wout (YES in S144), the CPU 72 determines whether or not the value obtained by subtracting the output increase amount ΔPe from the charge-discharge electric power Pbatt is equal to or larger than the charge upper limit Win (S146). This processing is designed to determine whether or not the output of the second motor-generator 54 can be decreased by the output increase amount ΔPe. If it is determined that the value obtained through subtraction is equal to or larger than the charge upper limit Win (YES in S146), the CPU 72 commands the stop of regeneration (S148). That is, in a situation where the result of the determination in S146 is positive, the stop of the regeneration process is commanded as soon as the regeneration performance request is switched from ON to OFF. Thus, the CPU 72 makes a positive determination in S32 of FIG. 2, and hence stops the regeneration process. Incidentally, when the regeneration performance request is turned OFF through the process shown in FIG. 6, the process of gradually decreasing the required engine output Pe* is started. Therefore, in a situation where the result of the determination in S146 is positive, the process of gradually decreasing the required engine output Pe* is performed, and the regeneration process is stopped.

Figure 12A:
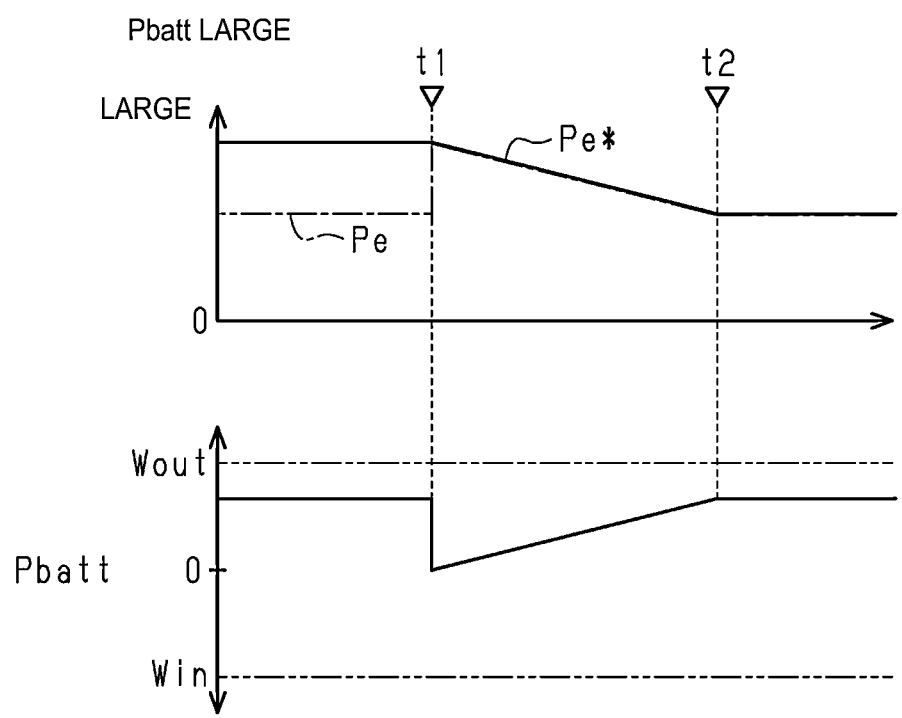
FIG. 12A is a time chart exemplifying still another process that is performed by the control apparatus according to the embodiment.

FIG. 12A exemplifies a case where the result of the determination in the processing of each of S144 and S146 is positive on the grounds that the charge-discharge electric power Pbatt is large. In this case, the process of gradually decreasing the required engine output Pe* is started, and the regeneration process is stopped at time t1. When the regeneration process is stopped, the engine output Pe increases stepwise by "{RDp/(1−RDp)}·Peb*" approximately. When the engine output Pe increases, the torque applied to the carrier C rises. Thus, the torque of the sun gear S rises. Thus, the absolute value of the value obtained by subtracting the first rotational speed Nmg1 from the first target rotational speed Nmg1* increases, so the first required torque Tmg1* calculated through the processing of S74 is changed. Thus, the second required torque Tmg2* calculated through the processing of S78 then decreases.

Therefore, the charge-discharge electric power Pbatt rapidly decreases at and after t1. However, since there is a sufficient difference between the charge-discharge electric power Pbatt at and before time t1 and the charge upper limit Win, the charge-discharge electric power Pbatt does not drop below the charge upper limit Win.

Incidentally, time t2 indicates a timing when the gradual decrease process is completed. When the required engine output Pe* is decreased gradually, the throttle opening degree command value TA* set through the processing of S94 decreases gradually. Therefore, the filling efficiency η decreases gradually. Accordingly, the amount of combustion energy in that one of the cylinders #1 to #4 in which combustion control is not stopped decreases gradually. Then at time t2, the engine output Pe becomes equal to the required engine output base value Peb*.

Figure 12B:
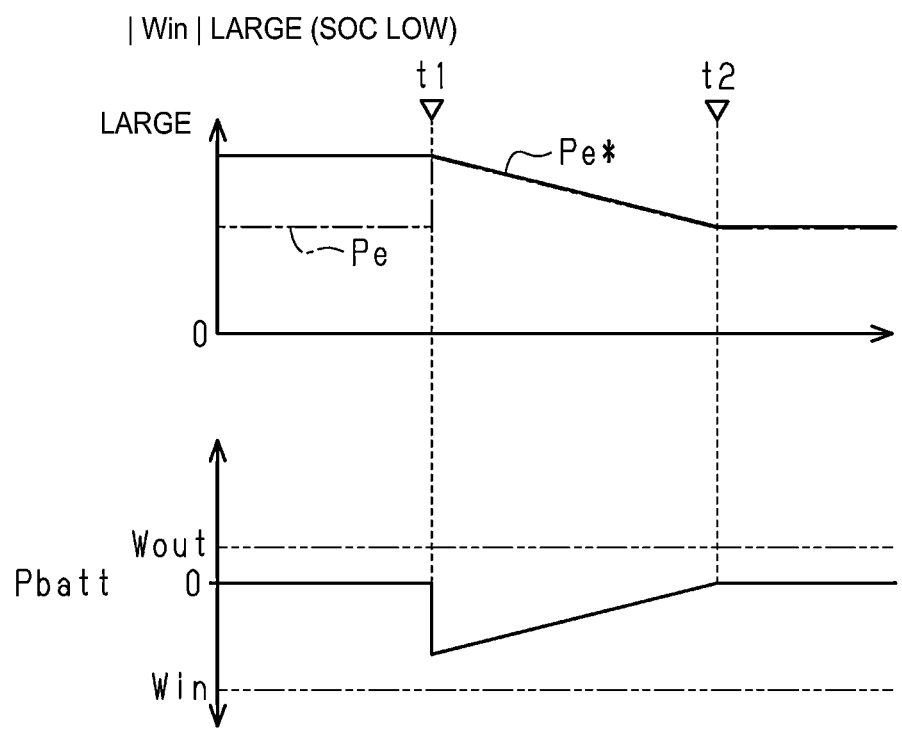
FIG. 12B is another time chart exemplifying the process that is performed by the control apparatus according to the embodiment.

FIG. 12B exemplifies a case where the result of the determination in the processing of each of S144 and S146 is positive on the grounds that the charging rate SOC is low and hence the absolute value of the charge upper limit Win is large. In FIG. 12B as well, the process of gradually decreasing the required engine output Pe* is started, and the regeneration process is stopped at time t1.

Returning to FIG. 11, if it is determined that the result of the determination in S144 is negative, the CPU 72 determines whether or not the value obtained by adding the output increase amount ΔPe to the charge-discharge electric power Pbatt is equal to or smaller than the discharge upper limit Wout (S150). If it is determined that the value obtained through addition is equal to or smaller than the discharge upper limit Wout (YES in S150), the CPU 72 then determines whether or not the increase coefficient K is "1" (S152). If it is determined that the increase coefficient K is "1" (YES in S152), the CPU 72 then shifts to the processing of S148. That is, if the result of the determination in the processing of S150 is positive, the regeneration process is stopped through completion of the process of gradually decreasing the required engine output Pe*.

Figure 13A:
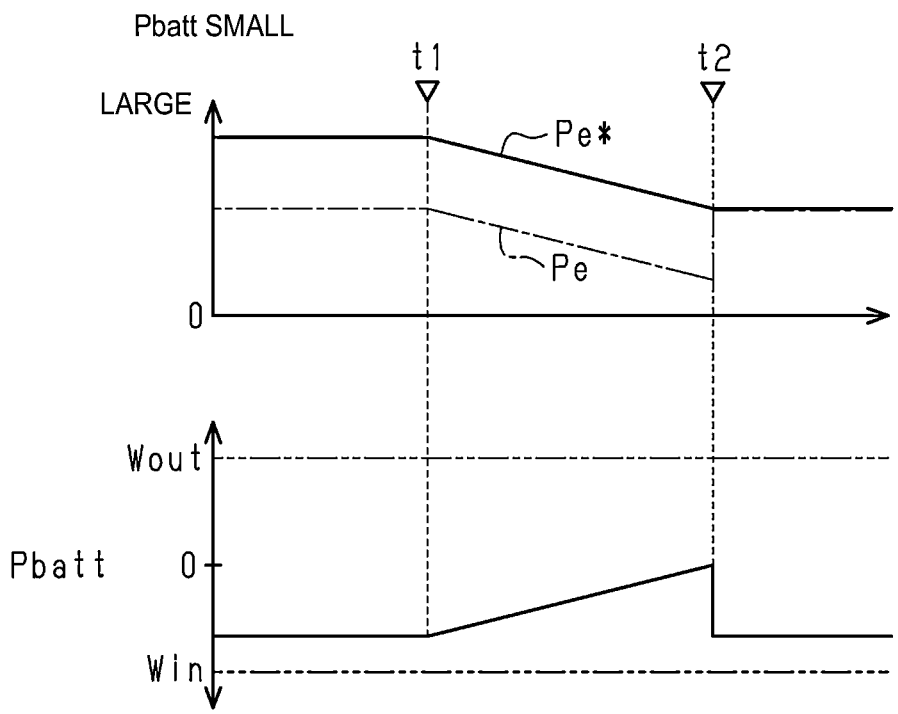
FIG. 13A is a time chart exemplifying still another process that is performed by the control apparatus according to the embodiment.

FIG. 13A exemplifies a case where the result of the determination in the processing of S144 is negative and the result of the determination in the processing of S150 is positive on the grounds that the charge-discharge electric power Pbatt is small In this case, after the process of gradually decreasing the required engine output Pe* is started at time t1, the regeneration process is stopped at time t2 when the gradual decrease process is completed.

When the gradual decrease process is started, the engine output Pe decreases gradually, so the torque applied to the carrier C also decreases gradually. Thus, the torque of the sun gear S decreases gradually. Thus, the absolute value of the value obtained by subtracting the first rotational speed Nmg1 from the first target rotational speed Nmg1* increases, so the first required torque Tmg1* calculated through the processing of S74 is changed. Thus, the second required torque Tmg2* calculated through the processing of S78 then increases gradually. Thus, the charge-discharge electric power Pbatt increases gradually.

Then, at time t2 when the regeneration process is stopped, the engine output Pe increases stepwise to become equal to the required engine output base value Peb*. A rapid rise in the output of the internal combustion engine 10 is compensated for by a decrease in the output of the second motor-generator 54. Therefore, the charge-discharge electric power Pbatt rapidly decreases at and after t2.

Figure 13B:
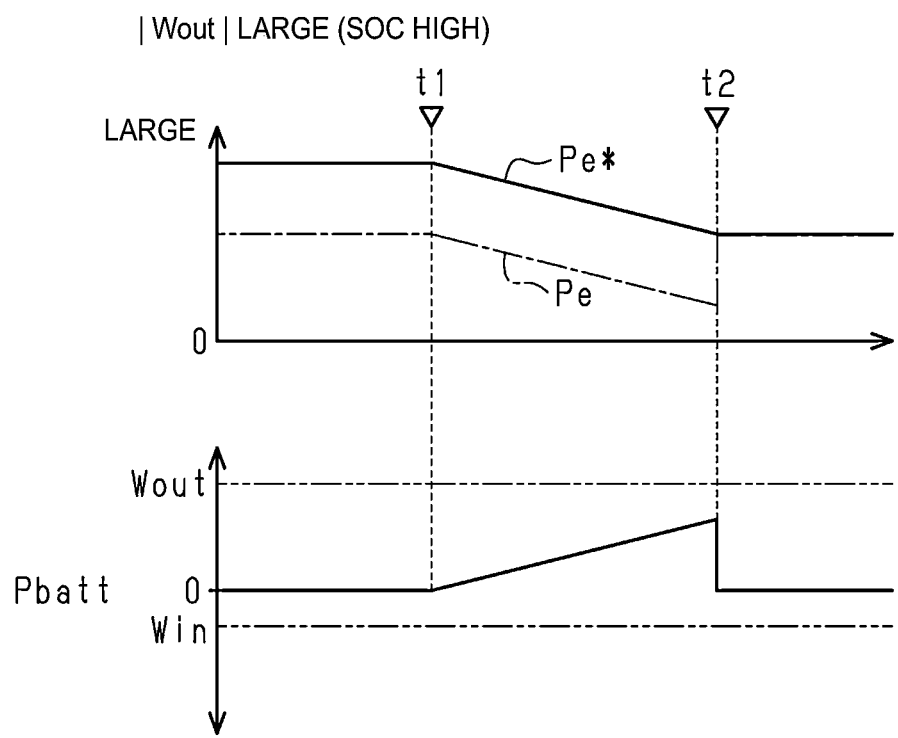
FIG. 13B is another time chart exemplifying the process that is performed by the control apparatus according to the embodiment.

FIG. 13B exemplifies a case where the discharge upper limit Wout is large and the result of the determination in the processing of S150 is positive on the grounds that the charging rate SOC is high. In FIG. 13B as well, after the process of gradually decreasing the required engine output Pe* is started at time t1, the regeneration process is stopped at time t2.

Returning to FIG. 11, if it is determined that the result of the determination in the processing of each of S146 and S150 is negative, the CPU 72 determines whether or not the increase coefficient K has become equal to "{Wout−Win−R·(Wout−Pbatt)}/(Wout−Win)·{1/(1−RDp)}" (S154). If the result of the determination in the processing of S154 is positive, the CPU 72 then shifts to the processing of S148. That is, the CPU 72 issues a regeneration stop command during the gradual decrease process.

Figure 14:
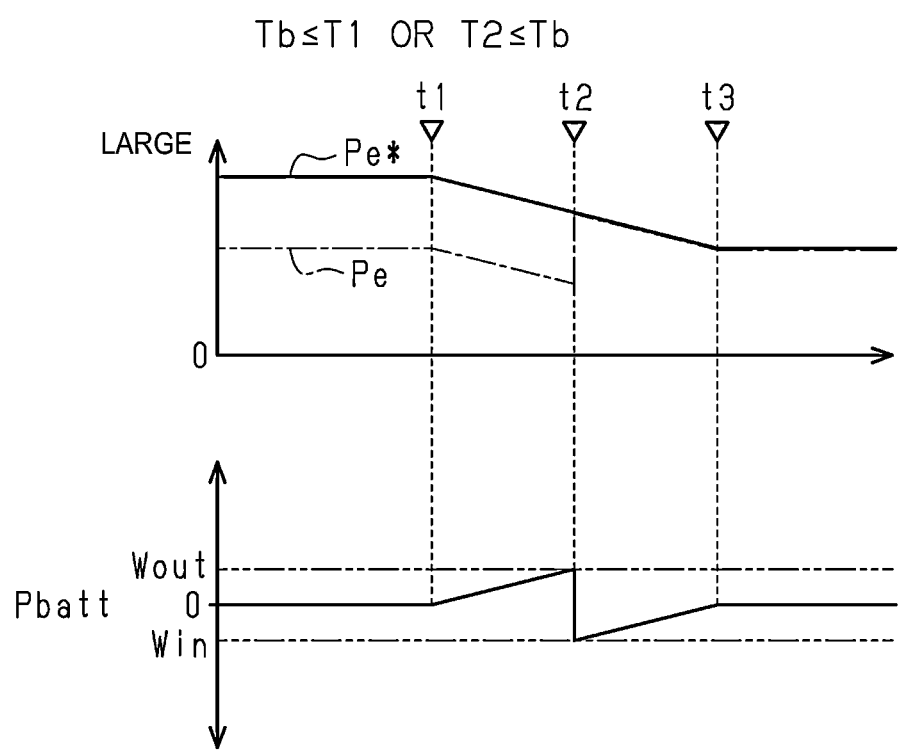
FIG. 14 is a time chart exemplifying still another process that is performed by the control apparatus according to the embodiment.

FIG. 14 exemplifies a case where the result of the determination in S146 or S150 is negative on the grounds that the absolute values of both the discharge upper limit Wout and the charge upper limit Win are small. It is assumed herein that the absolute values of both the discharge upper limit Wout and the charge upper limit Win are small because the temperature Tb is equal to or lower than the first temperature T1 or equal to or higher than the second temperature T2.

As shown in FIG. 14, the gradual decrease process is completed at time t3 after being started at time t1. The regeneration process is stopped at time t2 between time t1 and time t3. The output of the second motor-generator 54 increases gradually as the engine output Pe decreases gradually, until the regeneration process is stopped after the start of the gradual decrease process. Thus, the charge-discharge electric power Pbatt increases gradually. In contrast, when the regeneration process is stopped, the engine output Pe increases stepwise. This increase in output is compensated for by the second motor-generator 54. Therefore, the charge-discharge electric power Pbatt decreases rapidly. Then, after that, the charge-discharge electric power Pbatt increases gradually as the engine output Pe decreases gradually.

In this manner, the charge-discharge electric power Pbatt can be restrained from greatly changing as a result of the stop of the regeneration process, by stopping the regeneration process during the gradual decrease process. In particular, the processing of S154 is set such that the charge-discharge electric power Pbatt can be confined to the utmost within a range equal to or smaller than the discharge upper limit Wout and equal to or larger than the charge upper limit Win. That is, the processing of S154 is set such that the timing of starting the regeneration process is retarded as the difference between the discharge upper limit Wout and the charge-discharge electric power Pbatt increases.

In concrete terms, the right timing in the period in which the gradual decrease process is performed is decided by the following equation, in accordance with the relative magnitudes of the difference between the discharge upper limit Wout and the charge-discharge electric power Pbatt, and the difference between the charge upper limit Win and the charge-discharge electric power Pbatt.

$$\{1/(1-RDp)\}-K:K-1=(Wout-Pbatt):(Pbatt-Win)$$

Incidentally, the CPU 72 temporarily ends the series of processing steps shown in FIG. 11 when the processing of step S148 is completed or when the result of the determination in the processing of S140 is negative.

The operations and effects of the present embodiment will now be described.

When the request to perform the regeneration process is turned ON, the CPU 72 starts the process of gradually increasing the required engine output Pe*. The CPU 72 variably sets the retardation amount of the timing of starting the regeneration process with respect to the timing of starting the gradual increase process, in accordance with the state of the battery 59. Thus, the discharge upper limit Wout or the charge upper limit Win can be restrained from imposing restrictions on the compensation for the output by the second motor-generator 54.

According to the present embodiment described above, the operations and effects that will be described hereinafter are further obtained.

(1) In raising the required engine output Pe* to ensure that the internal combustion engine 10 itself compensates for a fall in the output of the internal combustion engine 10 resulting from the regeneration process, the CPU 72 increases the required engine output Pe* gradually. Thus, the controllability of the engine output Pe can be enhanced in comparison with the case where the required engine output Pe* is raised stepwise.

(Corresponding Relationship)

The corresponding relationship between the matters in the foregoing embodiment and the matters described in the foregoing section "means for solving the problem" is as follows. The corresponding relationship will be mentioned hereinafter for each of the numbers assigned to the means for solution described in the section "means for solving the problem". [1] The electrical storage device corresponds to the battery 59. The rotating electrical machine corresponds to the second motor-generator 54. The stop process corresponds to the processing of S26. The combustion energy amount increase process corresponds to the processing of S100 to S108 and S90 to S96. The timing variability process corresponds to the process depicted in FIG. 7. [2] The retardation amount in the case where the charge-discharge electric power is large is exemplified in FIG. 9A. The retardation amount in the case where the charge-discharge electric power is small is exemplified in FIG. 8A. [3] The retardation amount in the case where the charging rate is high is exemplified in FIG. 8B. The retardation amount in the case where the charging rate is low is exemplified in FIG. 9B. [4] The gradual increase process corresponds to the processing of S104. This process corresponds to the process exemplified in FIG. 10A. [5] The combustion energy amount decrease process corresponds to the processing of S110 to S116, S108, and S90 to S96. The timing variability process corresponds to the process depicted in FIG. 11. [6] The retardation amount in the case where the charge-discharge electric power is small is exemplified in FIG. 13A. The retardation amount in the case where the charge-discharge electric power is large is exemplified in FIG. 12A. [7] The retardation amount in the case where the charging rate is high is exemplified in FIG. 13B.

The retardation amount in the case where the charging rate is low is exemplified in FIG. 12B. [8] This is exemplified in FIG. 14.

(Other Embodiments)

Incidentally, the present embodiment can be carried out after being altered as follows. The present embodiment and the following modification examples can be carried out in combination with one another within a range that does not cause any technical contradiction.

"As for Timing Variability Process"

(a) As for Change in Timing of Starting Regeneration Process

In the process exemplified in FIG. 7, a return to the processing of S124 is made when the result of the determination in the processing of S132 is negative. In other words, when the difference between the discharge upper limit Wout and the charge-discharge electric power Pbatt and the difference between the charge upper limit Win and the charge-discharge electric power Pbatt fluctuate before the increase coefficient K becomes equal to "1/(1−RDp)", the timing of starting the regeneration process is changed in accordance with the fluctuation. Instead, however, a positive result of the determination in the processing of S132 may be awaited, for example, when the result of the determination in the processing of S132 is negative.

In the process exemplified in FIG. 7, a return to the processing of S124 is made when the result of the determination in the processing of S134 is negative. Instead, however, a positive result of the determination in the processing of S134 may be awaited, for example, when the result of the determination in the processing of S134 is negative.

In the processing of FIG. 7, the processing of S122 to S126, S130, and S132 may be deleted, and a shift to the processing of S128 may be made when the result of the determination in the processing of S134 is positive.

The variables that are directly utilized in deciding the timing of starting the regeneration process may not necessarily include the discharge upper limit Wout and the charge upper limit Win. For example, the charging rate SOC and the temperature Tb may be used instead of the discharge upper limit Wout and the charge upper limit Win. In this case, the timing of starting the regeneration process may be more advanced, for example, when the charging rate SOC is high than when the charging rate SOC is low. Thus, a process based on the processes exemplified in FIG. 8B and FIG. 9B can be realized. Besides, for example, when the temperature Tb is excessively high or excessively low, the regeneration process may be started while the required engine output Pe* is increased gradually. Thus, a process based on the process exemplified in FIG. 10A can be realized.

Incidentally, in the case where the variables that are directly utilized in deciding the timing of starting the regeneration process include the charge-discharge electric power Pbatt, the charging rate SOC, and the temperature Tb, the timing of starting the regeneration process may be computed with reference to a map. The map data used in this case have the charge-discharge electric power Pbatt, the charging rate SOC, and the temperature Tb as input variables, and the timing of starting the regeneration process as an output variable. Incidentally, in the case where the variables that are directly utilized in deciding the timing of starting the regeneration process do not include the discharge upper limit Wout or the charge upper limit Win, the utilized variables are not limited to the foregoing example. For example, among the three variables, namely, the charge-discharge electric power Pbatt, the charging rate SOC, and the temperature Tb, the utilized variables may include only the charge-discharge electric power Pbatt and the charging rate SOC.

(b) As for Change in Timing of Ending Regeneration Process

In the process exemplified in FIG. 11, a return to the processing of S144 is made when the result of the determination in the processing of S152 is negative. In other words, when the difference between the discharge upper limit Wout and the charge-discharge electric power Pbatt and the difference between the charge upper limit Win and the charge-discharge electric power Pbatt fluctuate before the increase coefficient K becomes equal to "1", the timing of ending the regeneration process is changed in accordance with the fluctuation. Instead, however, a positive result of the determination in the processing of S152 may be awaited, for example, when the result of the determination in the processing of S152 is negative.

In the process exemplified in FIG. 11, a return to the processing of S144 is made when the result of the determination in the processing of S154 is negative. Instead, however, a positive result of the determination in the processing of S154 may be awaited, for example, when the result of the determination in the processing of S154 is negative.

In the process of FIG. 11, the processing of S142 to S146, S150, and S152 may be deleted, and a shift to the processing of S148 may be made when the result of the determination in the processing of S154 is positive.

The variables that are directly utilized in deciding the timing of ending the regeneration process may not necessarily include the discharge upper limit Wout and the charge upper limit Win. For example, the charging rate SOC and the temperature Tb may be used instead of the discharge upper limit Wout and the charge upper limit Win. In this case, the timing of ending the regeneration process may be more retarded when the charging rate SOC is high than when the charging rate SOC is low, for example, in the case where the temperature Tb remains unchanged. Thus, a process based on the process exemplified in FIG. 13 can be realized. Besides, for example, when the temperature Tb is excessively high or excessively low, the regeneration process may be started while the required engine output Pe* is decreased gradually. Thus, a process based on the process exemplified in FIG. 14 can be realized.

Incidentally, in the case where the variables that are directly utilized in deciding the timing of ending the regeneration process include the charge-discharge electric power Pbatt, the charging rate SOC, and the temperature Tb, the timing of ending the regeneration process may be computed with reference to a map. The map data used in this case have the charge-discharge electric power Pbatt, the charging rate SOC, and the temperature Tb as input variables, and the timing of ending the regeneration process as an output variable. Incidentally, in the case where the variables that are directly utilized in deciding the timing of ending the regeneration process do not include the discharge upper limit Wout or the charge upper limit Win, the utilized variables are not limited to the foregoing example. For example, among the three variables, namely, the charge-discharge electric power Pbatt, the charging rate SOC, and the temperature Tb, the utilized variables may include only the charge-discharge electric power Pbatt and the charging rate SOC.

"As for Combustion Energy Amount Increase Process"

The process of gradually increasing the required engine output Pe* is not indispensable. For example, the required engine output Pe* may be raised stepwise to a value obtained by multiplying the required engine output Pe* by "1/(1−RDp)". In this case as well, the actual required engine output Pe* has a response delay, so it is effective to set the timing of starting the regeneration process as in the foregoing embodiment.

The operation unit of the internal combustion engine 10 that increases the filling efficiency η to increase the amount of combustion energy may not necessarily be the throttle valve 14. For example, this operation unit may be a device that makes the valve characteristics of the intake valves 18 variable.

It is not indispensable to realize an increase in the amount of combustion energy entirely by increasing the filling efficiency η. For example, part of the amount of increase in combustion energy may be covered by advancing the ignition timing.

"As for Combustion Energy Amount Decrease Process"

The process of gradually decreasing the required engine output Pe* is not indispensable. For example, the required engine output Pe* may be decreased stepwise. In this case as well, the actual engine output Pe has a response delay, so it is effective to set the timing of ending the regeneration process as in the foregoing embodiment.

The operation unit of the internal combustion engine 10 that decreases the filling efficiency η to decrease the amount of combustion energy may not necessarily be the throttle valve 14. For example, this operation unit may be a device that makes the valve characteristics of the intake valves 18 variable.

It is not indispensable to realize a decrease in the amount of combustion energy entirely by decreasing the filling efficiency η. For example, part of the amount of decrease in combustion energy may be covered by retarding the ignition timing.

"As for Compensation for Output by Rotating Electrical Machine"

In the foregoing embodiment, with a view to fulfilling the running output of the vehicle, the fluctuations in the output of the internal combustion engine 10 are compensated for by the second motor-generator 54 through the processing of S66 to S78. Instead, however, an amount of compensation for the torque generated by the second motor-generator 54 may be directly calculated by, for example, inputting the increase coefficient K or the fall variable RDp.

"As for Stop Process"

It is not indispensable to stop combustion control only in one of the cylinders.

The stop process may not necessarily be the regeneration process. For example, the stop process may be designed to stop combustion control only in one or some of the cylinders to supply oxygen to the three-way catalyst 32, and perform the control of making the air-fuel ratio of the air-fuel mixture in the other cylinders or cylinder equal to the theoretical air-fuel ratio when the amount of oxygen occluded in the three-way catalyst 32 is equal to or smaller than a prescribed value.

"As for Posttreatment Device"

The GPF 34 may not necessarily be provided downstream of the three-way catalyst 32 in the exhaust passage 30. Besides, the posttreatment device may not necessarily be equipped with the GPF 34. The GPF 34 may not necessarily be a filter having a three-way catalyst carried thereon. For example, in the case where a three-way catalyst is provided upstream, the GPF 34 may be a simple filter.

"As for Control Apparatus"

The control apparatus may not necessarily be equipped with the CPU 72 and the ROM 74 and perform software processing. For example, the control apparatus may be equipped with a dedicated hardware circuit, for example, an ASIC that subjects at least part of the values subjected to software processing in the foregoing embodiment to hardware processing. That is, the control apparatus may be configured as described below in (a), (b), or (c). (a) The control apparatus is equipped with a processing device that performs all the above processes according to a program, and a program storage device such as a ROM that stores the program. (b) The control apparatus is equipped with a processing device that performs one or some of the above processes according to a program, a program storage device, and a dedicated hardware circuit that performs the other processes or process. (c) The control apparatus is equipped with a dedicated hardware circuit that performs all the above processes. It should be noted herein that there may be one or more software execution devices each equipped with a processing device and a program storage device, and one or more dedicated hardware circuits.

"As for Vehicle"

A reduction gear may be interposed between the ring gear R and the second motor-generator 54, instead of directly coupling the ring gear R and the second motor-generator 54 to each other.

The hybrid electric vehicle may not necessarily be a series-parallel hybrid electric vehicle. For example, the hybrid electric vehicle may be a parallel hybrid electric vehicle. In this case as well, the compensation for a fall in the output of the internal combustion engine 10 by the motor-generators is not always possible when the charging rate SOC of the battery 59 or the like assumes a certain value, in the case where the regeneration process or the like is performed. It is therefore effective to perform the processes of setting the timings exemplified in the foregoing embodiment and the modification examples thereof.

What is claimed is:

1. A control apparatus that is applied to a hybrid electric vehicle equipped with a rotating electrical machine that applies motive power to a driving wheel, an electrical storage device that is charged and discharged by the rotating electrical machine, and an internal combustion engine that applies motive power to the driving wheel, wherein
   the internal combustion engine is equipped with a plurality of cylinders,
   a stop process, a combustion energy amount increase process, and a timing variability process are performed,
   the stop process is a process of stopping combustion control in one or some of the cylinders of the internal combustion engine,
   the combustion energy amount increase process is a process of increasing an amount of combustion energy in the cylinders or cylinder where the stop process is not performed, and
   the timing variability process is a process of varying a retardation amount of a timing of starting the stop process with respect to a timing of starting the combustion energy amount increase process in accordance with a state of the electrical storage device.

2. The control apparatus according to claim 1, wherein the timing variability process includes a process of variably setting the retardation amount of the timing of starting the stop process with respect to the timing of starting the combustion energy amount increase process in accordance with a charge-discharge electric power of the electrical storage device, and making the retardation amount in a case where the charge-discharge electric power is large equal to or larger than the retardation amount in a case where the charge-discharge electric power is small, and the charge-discharge electric power is positive when the electrical storage device is discharged.

3. The control apparatus according to claim 1, wherein the timing variability process includes a process of variably setting the retardation amount of the timing of starting the stop process with respect to the timing of starting the combustion energy amount increase process in accordance with a charging rate of the electrical storage device, and making the retardation amount in a case where the charging rate is high equal to or smaller than the retardation amount in a case where the charging rate is low.

4. The control apparatus according to claim 1, wherein the combustion energy amount increase process is a process of gradually increasing an amount of combustion energy in the cylinders or cylinder where the stop process is not performed, and the timing variability process includes a process of starting the stop process while the amount of combustion energy increases gradually, when a temperature of the electrical storage device is equal to or lower than a first temperature or equal to or higher than a second temperature that is higher than the first temperature.

5. A control apparatus that is applied to a hybrid electric vehicle equipped with a rotating electrical machine that applies motive power to a driving wheel, an electrical storage device that is charged and discharged by the rotating electrical machine, and an internal combustion engine that applies motive power to the driving wheel, wherein the internal combustion engine is equipped with a plurality of cylinders, a stop process, a combustion energy amount decrease process, and a timing variability process are performed, the stop process is a process of stopping combustion control in one or some of the cylinders of the internal combustion engine, the combustion energy amount decrease process is a process of decreasing an amount of combustion energy in the cylinders or cylinder where the stop process is not performed, and the timing variability process includes a process of varying a timing of ending the stop process with respect to a timing of starting the combustion energy amount decrease process in accordance with a state of the electrical storage device.

6. The control apparatus according to claim 5, wherein the timing variability process includes a process of variably setting a retardation amount of the timing of ending the stop process with respect to the timing of starting the combustion energy amount decrease process in accordance with a charge-discharge electric power of the electrical storage device, and making the retardation amount in a case where the charge-discharge electric power is small equal to or larger than the retardation amount in a case where the charge-discharge electric power is large, and the charge-discharge electric power is positive when the electrical storage device is discharged.

7. The control apparatus according to claim 5, wherein the timing variability process includes a process of variably setting a retardation amount of the timing of ending the stop process with respect to the timing of starting the combustion energy amount decrease process in accordance with a charging rate of the electrical storage device, and making the retardation amount in a case where the charging rate is high equal to or larger than the retardation amount in a case where the charging rate is low.

8. The control apparatus according to claim 5, wherein the combustion energy amount decrease process is a process of gradually decreasing an amount of combustion energy in the cylinders or cylinder where the stop process is not performed, and the timing variability process includes a process of ending the stop process while the amount of combustion energy decreases gradually, when a temperature of the electrical storage device is equal to or lower than a first temperature or equal to or higher than a second temperature that is higher than the first temperature.

* * * * *